(12) United States Patent
Lee

(10) Patent No.: US 9,703,425 B2
(45) Date of Patent: Jul. 11, 2017

(54) CAPACITIVE TOUCH DETECTING DEVICE AND METHOD USING LEVEL SHIFT, AND DISPLAY DEVICE USING THE SAME

(75) Inventor: Sung Ho Lee, Hwaseong-si (KR)

(73) Assignee: G2TOUCH CO., LTD., Seongnam (KR)

( * ) Notice: Subject to any disclaimer, the term of this patent is extended or adjusted under 35 U.S.C. 154(b) by 0 days.

(21) Appl. No.: 13/820,146

(22) PCT Filed: Sep. 1, 2011

(86) PCT No.: PCT/KR2011/006501
§ 371 (c)(1),
(2), (4) Date: Mar. 1, 2013

(87) PCT Pub. No.: WO2012/030183
PCT Pub. Date: Mar. 8, 2012

(65) Prior Publication Data
US 2013/0162595 A1 Jun. 27, 2013

(30) Foreign Application Priority Data

Sep. 1, 2010 (KR) .................. 10 2010 0085360
Sep. 4, 2010 (KR) .................. 10 2010 0086754

(51) Int. Cl.
G06F 3/044 (2006.01)
G06F 3/041 (2006.01)

(52) U.S. Cl.
CPC ............ *G06F 3/044* (2013.01); *G06F 3/0412* (2013.01); *G06F 3/0416* (2013.01); *G06F 3/0418* (2013.01); *G06F 2203/04104* (2013.01); *G06F 2203/04111* (2013.01)

(58) Field of Classification Search
CPC .... G06F 3/0412; G06F 3/0416; G06F 3/0418; G06F 3/044; G06F 2203/04111; G06F 2203/04104
USPC .................................................. 345/173–174
See application file for complete search history.

(56) References Cited

U.S. PATENT DOCUMENTS

| | | | |
|---|---|---|---|
| 5,847,690 A | 12/1998 | Boie et al. | |
| 7,466,148 B2* | 12/2008 | Fridman et al. | 324/686 |
| 2003/0122798 A1* | 7/2003 | Shin | 345/173 |
| 2004/0004488 A1* | 1/2004 | Baxter | 324/678 |
| 2007/0091078 A1 | 4/2007 | Park et al. | |
| 2008/0062148 A1 | 3/2008 | Hotelling et al. | |

(Continued)

FOREIGN PATENT DOCUMENTS

| | | |
|---|---|---|
| KR | 10-2007-0064769 A | 6/2007 |
| KR | 10-2009-0067376 A | 6/2009 |

(Continued)

OTHER PUBLICATIONS

Office Action for U.S. Appl. No. 14/811,111, dated Mar. 10, 2017.

*Primary Examiner* — Vijay Shankar
*Assistant Examiner* — Abhishek Sarma

(57) ABSTRACT

Provided is a touch detecting device that detects occurrence of a level shift phenomenon of a voltage variation to thus acquire a touch signal, when a touch capacitance due to a touch input is added to a common electrode capacitance formed between a common electrode and a sensor pattern. Accordingly, the touch signal may be stably obtained in spite of external noise, and an influence due to a parasitic capacitance may be minimized.

22 Claims, 30 Drawing Sheets

(56) References Cited

U.S. PATENT DOCUMENTS

| | | |
|---|---|---|
| 2008/0128182 A1* | 6/2008 | Westerman et al. ........ 178/18.06 |
| 2008/0192018 A1* | 8/2008 | Park et al. .................... 345/173 |
| 2009/0231294 A1* | 9/2009 | Wu ............................... 345/173 |
| 2009/0256818 A1 | 10/2009 | Noguchi et al. |
| 2010/0060600 A1* | 3/2010 | Wang et al. ................... 345/173 |
| 2010/0182273 A1* | 7/2010 | Noguchi et al. .............. 345/174 |
| 2010/0321318 A1 | 12/2010 | Oohira |

FOREIGN PATENT DOCUMENTS

| | | |
|---|---|---|
| KR | 10-2009-0107713 | 10/2009 |
| KR | 10-2010-0015225 A | 2/2010 |
| KR | 10-2010-0048236 | 5/2010 |

\* cited by examiner

CAPACITIVE TOUCH DETECTING DEVICE AND METHOD USING LEVEL SHIFT, AND DISPLAY DEVICE USING THE SAME

TECHNICAL FIELD

The invention relates to a method and device for detecting a capacitive touch input of a bodily finger or a touch input instrument having conductive characteristics similar to the bodily finger, and more particularly, to a touch input detecting method and device that detects occurrence of a level shift phenomenon of a voltage to thus acquire a touch signal, when a touch capacitance due to a touch input is added to a common electrode capacitance formed between a common electrode and a sensor pattern.

BACKGROUND ART

Usually, touch screen panels are input devices which are respectively attached onto display devices such as LCDs (Liquid Crystal Displays), PDPs (Plasma Display Panels), OLED (Organic Light Emitting Diode) displays, and AMO-LED (Active Matrix Organic Light Emitting Diode) displays, to thus generate an input signal corresponding to a position where an object such as a finger or a touch pen is touched on the touch screen panel. The touch screen panels are widely used in various fields of mobile devices such as small-sized portable mobile phones, industrial terminal devices, and DIDs (Digital Information Devices).

Various types of conventional touch screen panels are disclosed, but resistive type touch screen panels having simple manufacturing processes and inexpensive manufacturing costs have been used most widely. The resistive type touch screen panels, however, have a low transmittance and undergo a pressure to be applied, respectively, to thereby cause an inconvenient use. The resistive type touch screen panels also have difficulties in recognizing multiple touches and gestures.

In contrast, capacitive touch screen panels may have a high transmittance, recognize soft touches, and recognize multiple touches and gestures satisfactorily, to thus widen a market share gradually.

FIG. 1 shows an example of the structure of a conventional capacitive touch screen panel. Referring to FIG. 1, in the conventional capacitive touch screen panel, transparent conductive films are respectively formed on the top and bottom surfaces of a transparent substrate 2 made of plastic or glass. Metal electrodes 4 for applying a voltage are formed at each of four corners of the transparent substrate 2. The transparent conductive film is formed of transparent metal such as ITO (Indium Tin Oxide) or ATO (Antimony Tin Oxide). The metal electrodes 4 respectively formed at the four corners of the transparent conductive film are formed by printing low resistivity conductive metal such as silver (Ag). A resistor network is formed around the metal electrodes 4. The resistor network is formed in a linearization pattern in order to transmit a control signal equally on the entire surface of the transparent conductive film. A protective film is coated on top of the transparent conductive film including the metal electrodes 4.

In the case of the capacitive touch screen panel, when a high-frequency alternating-current (AC) voltage is applied to the metal electrodes 4, the high-frequency alternating-current (AC) voltage is spread to the whole surface of the transparent substrate 2. Here, if a finger 8 or a conductive touch input unit lightly touches the top surface of the transparent conductive film on the transparent substrate 2, a certain amount of electric current is absorbed into the human body and a change in the electric current is detected by a built-in electric current sensor of a controller 6, to thus calculate the amount of electric current at the four metal electrode 4, respectively, and to thereby recognize a touch point.

However, the capacitive touch screen panel shown in FIG. 1 detects the amount of micro-current, and requires an expensive detecting device, to thus raise the price of the capacitive touch screen panel, and make it difficult to recognize multiple touches.

In recent years, in order to overcome such problems, the capacitive touch screen panel shown in FIG. 2 has been chiefly used. The touch screen panel of FIG. 2 includes a transverse linear sensor pattern 5a, a longitudinal linear sensor pattern 5b, and a touch drive IC (Integrated Circuit) 7 for analyzing a touch signal. The touch screen panel detects a magnitude of a capacitance that is formed between the linear sensor pattern 5 and the finger 8. Here, the touch screen panel scans the transverse linear sensor pattern 5a and the longitudinal linear sensor pattern 5b to thus detect a touch signal and to thereby recognize a plurality of touch points.

However, when the touch screen panel is mounted on a display device such as a liquid crystal display (LCD) and is used, it may be difficult to detect a signal due to noise. For example, the liquid crystal display (LCD) uses a common electrode and an alternating-current (AC) common voltage Vcom is applied the common electrode in some cases. The common voltage Vcom of the common electrode acts as noise when detecting touch points.

FIG. 3 shows an example in which a conventional capacitive touch screen panel is installed on a liquid crystal display (LCD). A display device 200 such as the liquid crystal display (LCD) has a structure that liquid crystal is sealed and filled between a lower-side thin film transistor (TFT) substrate 205 and an upper-side color filter 215 to thereby form a liquid crystal layer 210. To seal the liquid crystal, the TFT substrate 205 and the color filter 215 are joined by sealants 230 at their outer portions. Although they are not shown, polarizing plates are attached on the top and bottom of the LCD panel, and besides optical sheets such as a back light unit (BLU) and a brightness enhancement film (BEF) are provided.

As shown, a touch screen panel is provided on top of the display device 200. The touch screen panel has a structure that the linear sensor pattern 5 is put on the upper surface of the substrate 1. A protection panel 3 for protecting the linear sensor pattern 5 is attached on top of the substrate 1. The touch screen panel is bonded to the outer portion of the display device 200 through the medium of an adhesive member 9 such as a double adhesive tape (DAT), and an air gap 9a is formed between the display device 200 and the touch screen panel.

In this configuration, if a touch occurs as shown in FIG. 3, a capacitance Ct is formed between the finger 8 and the linear sensor pattern 5. Meanwhile, as shown, a capacitance Cvcom is formed between the linear sensor pattern 5 and a common electrode 220 formed on the lower surface of the color filter 215 of the display device 200, and an unknown parasitic capacitance Cp also functions at the linear sensor pattern 5. Thus, the same circuit as an equivalent circuit of FIG. 4 is configured.

Here, the conventional touch screen panel recognizes a touch by detecting an amount of change in the capacitance Ct, where the background components such as the capacitances Cvcom and Cp act as noise at the time of detecting the capacitance Ct. For example, small- and medium-sized LCDs for mobile devices employ a line inversion method in which the common voltage Vcom of the common electrode 220 alternates by one or a plurality of gate lines as shown in FIG. 5, in order to reduce current consumption, and thus the alternating electric field acts as considerable noise at the time of detection of touches.

Typically, in order to remove the noise, the air gap 9a is placed between the touch screen panel and the display device 200 as shown in FIG. 3. In addition, although it is not shown, an ITO layer is coated on the lower surface of the substrate 1 of the touch-screen panel, to thereby form a shield layer. In addition, the shield layer is grounded with the ground signal.

However, in the case of the conventional art, products become thick and the quality of the products deteriorates due to the air gap 9a. In addition, the conventional art requires a separate process of configuring the shield layer, thereby causing a rise of a manufacturing cost. In particular, in the case of forming a built-in touch screen panel in a liquid crystal display (LCD), it is very difficult to form the air gap 9a or the shield layer, and thus it is also very difficult to form the built-in touch screen panel in a display device such as the liquid crystal display (LCD).

DISCLOSURE

Technical Problem

In order to solve the above-mentioned problems of a conventional capacitive touch screen panel, it is an object of the present invention to provide a touch detecting device and method, and a display device having a built-in touch detecting device, which minimizes an influence due to external noise, an influence due to a parasitic capacitance, and an influence due to a common electrode of the display device.

In addition, it is another object of the present invention to provide a touch detecting device and method, and a display device having a built-in touch detecting device, which reliably detects touch signals, and simultaneously facilitates to incorporate a built-in touch screen panel in the display device such as a liquid crystal display (LCD).

Technical Solution

To attain the above object of the present invention, according to an aspect of the present invention, there is provided a capacitive touch detecting device comprising:

at least one sensor pattern that forms a touch capacitance (Ct) between the touch input instrument and the sensor pattern, and that is disposed at a distance spaced from a common electrode to thus form a common electrode capacitance (Cvcom);

a charging unit that supplies a charge signal to the sensor pattern to thus accumulate charges in the common electrode capacitance (Cvcom); and a level shift detecting unit that is connected to the sensor pattern, and that detects a level shift occurs in a voltage variation in the sensor pattern at the time of occurrence of a touch input, with respect to a voltage variation in the sensor pattern at the time of non-occurrence of a touch input, to thereby acquire a touch signal.

Here, the common electrode has a common voltage (Vcom) level that alternates at a predetermined frequency, and the level shift detecting unit detects a level shift between the voltage variations arising from the sensor pattern by the common voltage (Vcom) before and after the occurrence of the touch input.

Preferably but not necessarily, the voltage variation at the time of non-occurrence of a touch input is determined by following Equation 1, the voltage variation at the time of addition of the touch capacitance (Ct) is determined by following Equation 2, and the level shift uses a difference between the voltage variations of the following Equations 1 and 2, $$\Delta Vsensor = \pm (VcomH - VcomL)\frac{Cvcom}{Cvcom + Cp} \quad 1$$

$$\Delta Vsensor = \pm (VcomH - VcomL)\frac{Cvcom}{Cvcom + Cp + Ct}, \quad 2$$

in which $\Delta Vsensor$ is a voltage variation in the sensor pattern, VcomH is a high level voltage of the common electrode, VcomL is a low level voltage of the common electrode, Cvcom is a common electrode capacitance, Cp is a parasitic capacitance, and Ct is a touch capacitance.

Preferably but not necessarily, the level shift detecting unit detects the level shift in the sensor pattern at the rising time and/or falling time of the common voltage level.

Preferably but not necessarily, the level shift detecting unit detects a touch share of the touch input instrument with respect to the sensor pattern on the basis of size of the level shift.

Preferably but not necessarily, the level shift detecting unit comprises a differential amplifier to differentially amplify the signal from the sensor pattern.

Preferably but not necessarily, the capacitive touch detecting device further comprises a common voltage supply unit that applies the common voltage to the common electrode.

According to another aspect of the present invention, there is also provided a capacitive touch detecting method for detecting occurrence of a touch capacitance (Ct) by an approach of a touch input instrument to at least one sensor pattern, the capacitive touch detecting method comprising the steps of:

supplying a charging signal to the sensor pattern and a common electrode capacitance (Cvcom) formed in the sensor pattern;

interrupting the supply of the charging signal and isolating the charges of the charging signal;

detecting a voltage variation in the sensor pattern by a common voltage (Vcom) applied to the common electrode capacitance (Cvcom); and detecting occurrence of a level shift between the voltage variations before and after occurrence of a touch input, to thus acquire a touch signal.

Preferably but not necessarily, the capacitive touch detecting method further comprises a step of differentially amplifying the signal from the sensor pattern.

Preferably but not necessarily, a differential input signal is a voltage variation at the time of a non-occurrence of a touch input, at the differential amplifying step.

Preferably but not necessarily, the capacitive touch detecting method further comprises a step of storing the voltage variation at the time of the non-occurrence of the touch input in a memory with respect to the sensor pattern, respectively.

According to still another aspect of the present invention, there is also provided a display device having a built-in capacitive touch detecting device wherein the capacitive touch detecting device comprises:

at least one sensor pattern that forms a touch capacitance (Ct) between the touch input instrument and the sensor pattern, and that is disposed at a distance spaced from a common electrode to thus form a common electrode capacitance (Cvcom);

a charging unit that supplies a charge signal to the sensor pattern to thus accumulate charges in the common electrode capacitance (Cvcom); and a level shift detecting unit that is connected to the sensor pattern, and that detects a level shift occurs in a voltage variation in the sensor pattern at the time of occurrence of a touch input, with respect to a voltage variation in the sensor pattern at the time of non-occurrence of a touch input, to thereby acquire a touch signal.

Here, the common electrode has a common voltage (Vcom) level that alternates at a predetermined frequency, and the level shift detecting unit detects a level shift between the voltage variations arising from the sensor pattern by the common voltage (Vcom) before and after the occurrence of the touch input.

Preferably but not necessarily, the display device further comprises a common voltage receiving unit that receives common voltage information of the common electrode.

Preferably but not necessarily, the display device further comprises a common voltage detecting unit that detects a common voltage level of the common electrode.

Preferably but not necessarily, the charging unit and the level shift detecting unit are provided in an invisible region.

Advantageous Effects

In the case of a capacitive touch detecting device using a level shift, a capacitive touch detecting method using the level shift, a capacitive touch screen panel using the level shift, and a display device with a built-in capacitive touch screen panel, according to the present invention, influences due to a parasitic capacitance generated by vertical noise, a coupling phenomenon, or other factors from the display device are minimized, and erroneous recognition of signals does not occur.

In addition, the present invention detects a touch input at a relatively high voltage level, to thus easily capture a signal even with a small cross-sectional area of a touch input instrument, and to thereby make it possible to perform a stylus pen input.

In addition, the present invention obtains a touch share of a touch input instrument depending on size of a shift level, to thus increase resolution and enable fine handwriting and drawing.

In addition, the present invention may configure an active region of a touch panel into a single-layer, to thus simplify a manufacturing process and provide an effect of obtaining an excellent yield.

DESCRIPTION OF DRAWINGS

The above and other objects and advantages of the invention will become more apparent by describing the preferred embodiments with reference to the accompanying drawings in which.

BEST MODE

Figure 1:
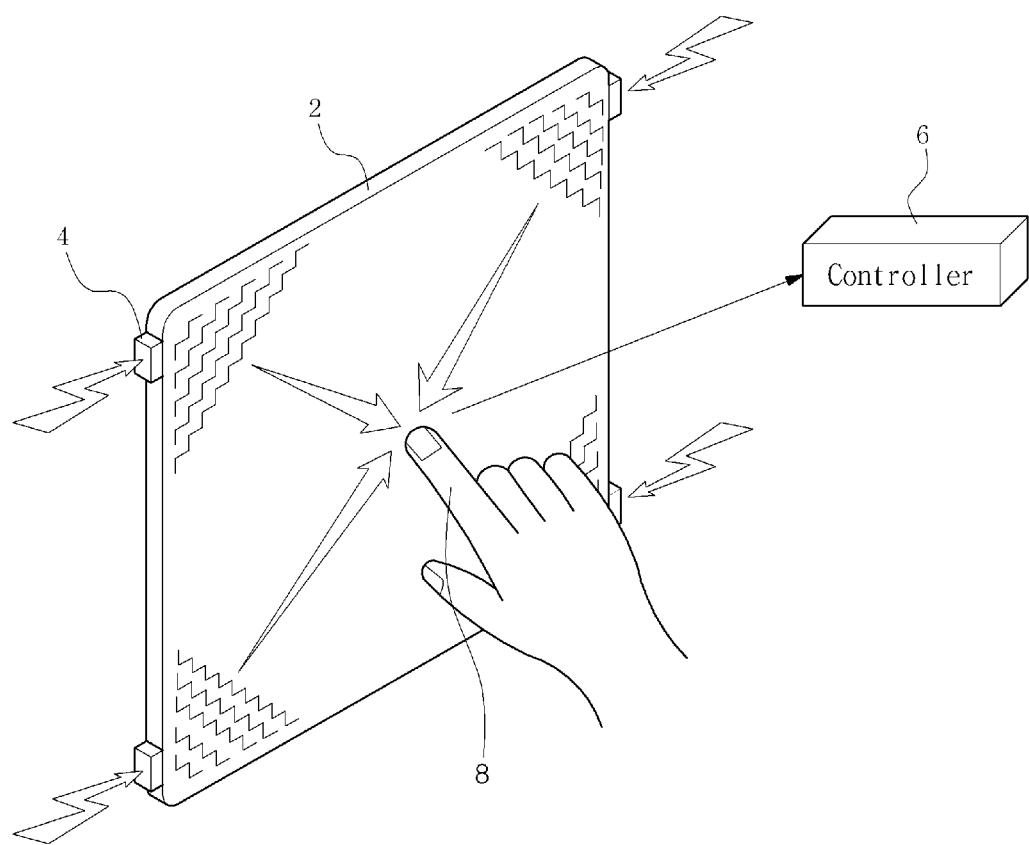
FIG. 1 is a perspective view showing an example of a conventional capacitive touch screen panel.
Figure 2:
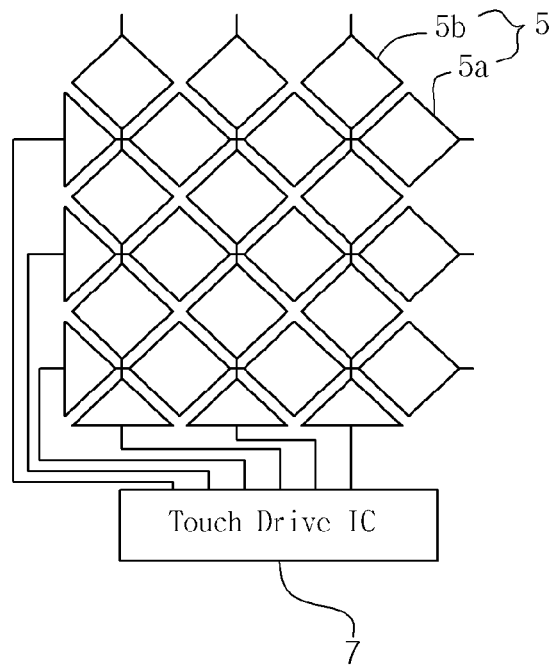
FIG. 2 is a plan view showing another example of a conventional capacitive touch screen panel.
Figure 3:
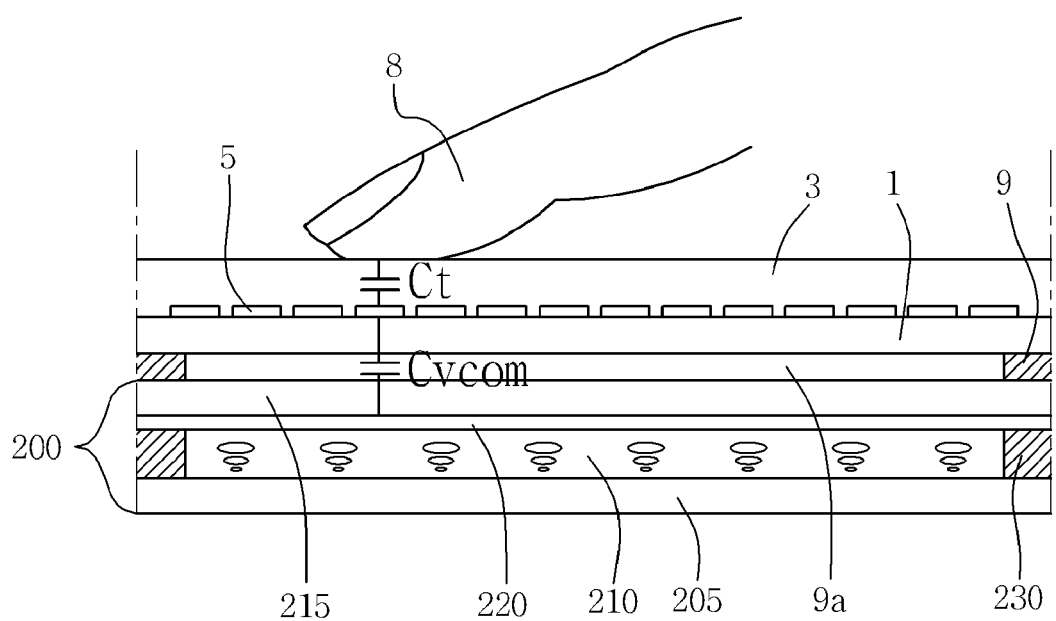
FIG. 3 is a cross-sectional view showing an example in which a touch screen panel of FIG. 2 is installed on top of a display device.
Figure 4:
FIG. 4 is an equivalent circuit diagram showing that a touch capacitance is detected in FIG. 3.

Hereinbelow, preferred embodiments of the present invention will be described in detail with reference to the accompanying drawings.

First, the present invention relates to a capacitive touch detecting device using a level shift, a capacitive touch detecting method using the level shift, a capacitive touch screen panel using the level shift, and a display device with a built-in capacitive touch screen panel. A conventional capacitive touch detecting device detects a change in capacitance due to contact of a finger and the like, but the capacitive touch detecting device according to the present invention configures a common electrode with an alternating voltage and detects a voltage variation caused by a correlation between the common electrode and the sensor pattern.

A touch detecting system according to the present invention compares a voltage variation due to a common electrode capacitance between a common electrode and a sensor pattern at the time of non-occurrence of a touch input, with a voltage variation that is generated when a touch capacitance is added to the common electrode capacitance at the time of occurrence of a touch input, and detects a level shift that is a difference in magnitudes between the two voltage variations, to thus minimize influences caused by noise or a parasitic capacitance generated from a display device, and to thereby acquire a touch signal more reliably.

The present invention detects a non-contact touch input of a finger or a touch input instrument having electrical characteristics similar to the finger. Here, the term "non-contact touch input" means that a touch input instrument of a finger and the like performs a touch input at a state spaced by a predetermined distance apart from a sensor pattern by a substrate. The touch input instrument may contact an outer surface of the substrate. However, even in this case, the touch input instrument and the sensor pattern remain in a non-contact state. Therefore, a touch action of a finger on a sensor pattern may be expressed in the term "approach." Meanwhile, since a finger remains in a contact state for an outer surface of the substrate, a touch action of a finger on the substrate may be expressed in the term "contact." In this specification and claims, the terms "approach" and "contact" are commonly used as the same meanings as above.

The components such as "~ portion" are configurational elements that perform certain functions and mean software configurational elements or hardware configurational elements such as FPGA (Field-Programmable Gate Array) or ASIC (Application Specific Integrated Circuit). However, the components such as "~ portion" are not limited to the software or hardware configurational elements. For example, the software or hardware configurational elements can be configured into an addressable storage medium, or can be configured to reproduce one or more processors. As an example, the software or hardware configurational elements can include some processes, functions, properties, subroutines, segments of program codes, firmware, Microcode, databases, and variables. In addition, the software or hardware configurational elements can be included in larger components or can include smaller components. In addition, the software or hardware configurational elements may contain their own central processing units (CPUs) therein.

Figure 6:
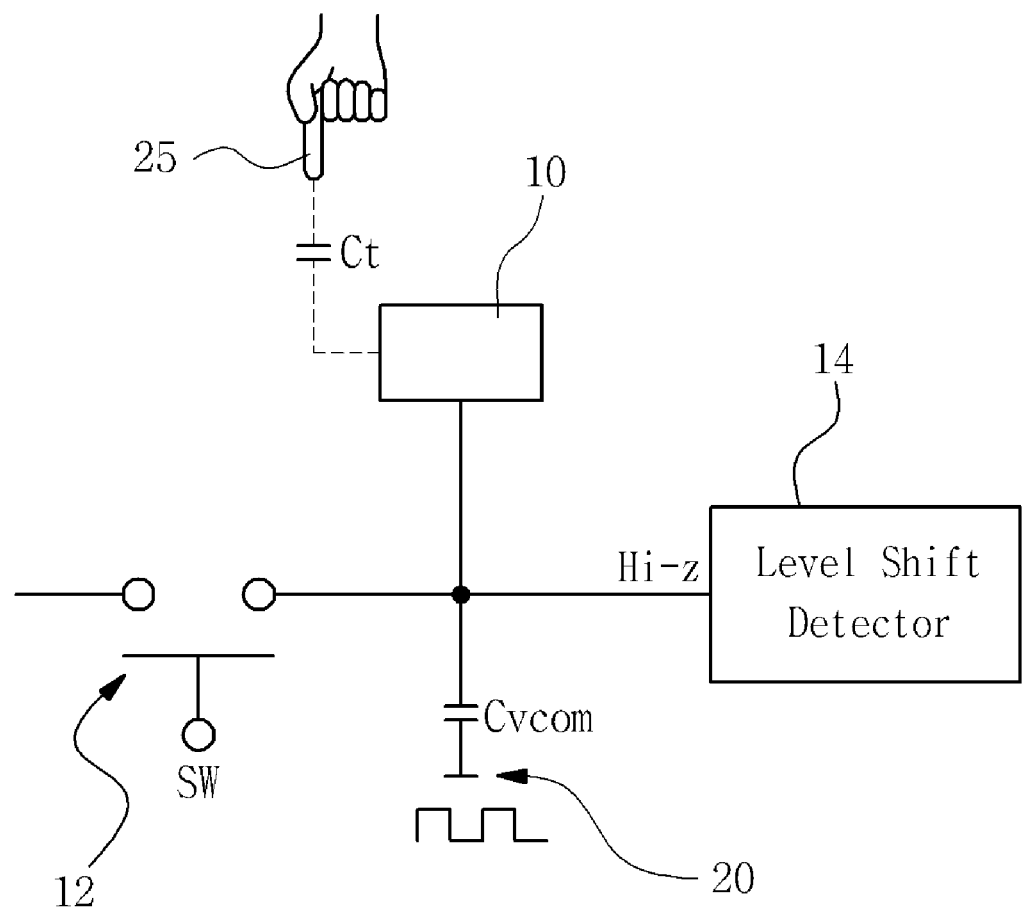
FIG. 6 is a circuit diagram illustrating a touch detecting device according to the present invention.

FIG. 6 is a circuit diagram illustrating a touch detecting device according to the present invention.

Figure 7A:
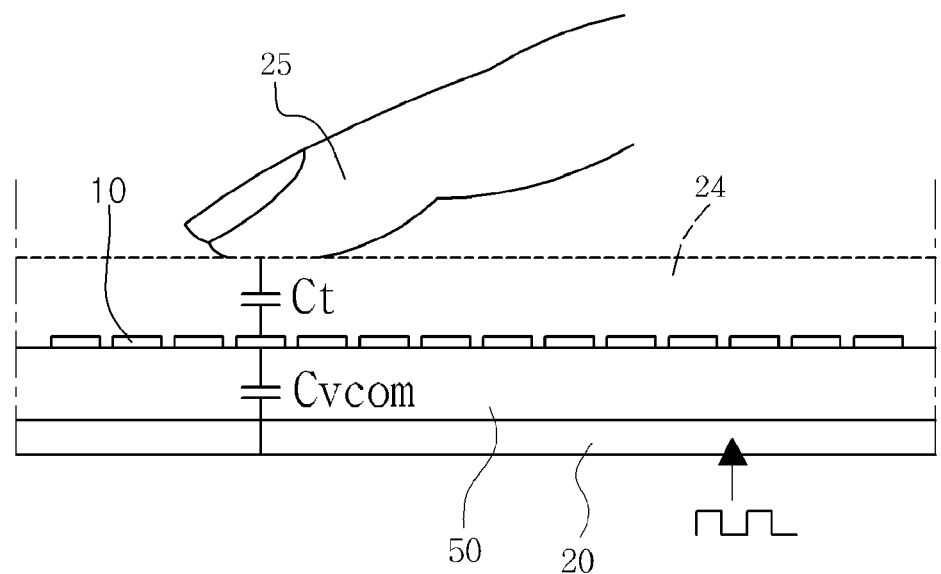
FIG. 7A is a cross-sectional view of a touch screen panel according to an embodiment of the present invention.

FIG. 7A is a cross-sectional view illustrating a basic configuration of a touch screen panel in which a common electrode is formed, according to an embodiment of the present invention.

Figure 7B:
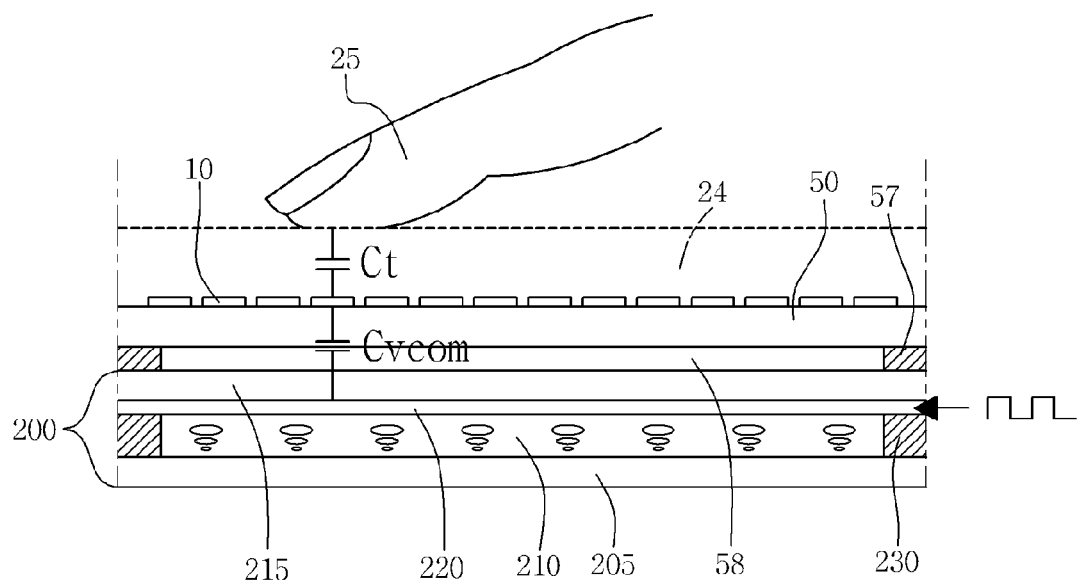
FIG. 7B is a cross-sectional view of a touch screen panel and a display device according to an embodiment of the present invention.

FIG. 7B is a cross-sectional view of a touch screen panel in which a common electrode is formed and a display device, according to an embodiment of the present invention.

First referring to FIG. 6, the touch detecting device according to the present invention includes a sensor pattern 10, a common electrode 20, a charging unit 12, and a level shift detector 14.

The sensor pattern 10 is an electrode patterned to detect a touch input, and a touch capacitance Ct is formed between the sensor pattern 10 and a finger 25 of a human body, or a touch input instrument such as an electric conductor similar to the finger. The sensor pattern 10 is formed as transparent electric conductors in the case that the touch screen panel is put on the display device. For example, the sensor pattern 10 is formed of a transparent material, such as ITO (Indium Tin Oxide), ATO (Antimony Tin Oxide), CNT (Carbon Nano Tube), or IZO (Indium Zinc Oxide) or a transparent material with conductive characteristics similar to the ITO, ATO, CNT, or IZO. In the case of a touch screen panel such as a touch keyboard or a touch pad that is not mounted on the display device, the sensor pattern 10 may be formed of metal.

The sensor pattern 10 may be patterned in various forms. For example, the sensor pattern 10 may be arranged in a dot-matrix form in which isolated islands are arranged in a matrix form in an active region of a substrate 50, or the sensor pattern 10 may be arranged so that linear patterns are arranged lengthwise and crosswise on the substrate 50. A form of the sensor pattern 10 will be described in an embodiment to be described later.

A common electrode 20 is an electrode spaced apart from the sensor pattern 10. As shown in FIG. 7A, the common electrode 20 may be formed in a touch screen panel. Alternatively, as shown in FIG. 71, a common electrode 220 of a display device may be used as the common electrode.

In the embodiment illustrated in FIG. 7A, the sensor pattern 10 may be formed on the upper surface of the substrate 50 and the common electrode 20 may be formed on the lower surface of the substrate 50, as shown in FIG. 7A, in order to keep a uniform spacing between the common electrode 20 and the sensor pattern 10. The common electrode 20 may be formed over the entire area of the lower surface of the substrate 50.

Meanwhile, since the common electrode 20 is used to detect a level shift, which will be described later, in the embodiment illustrated in FIG. 7A, the common electrode 20 is not necessarily formed physically on the touch screen panel, but may be formed in any position equivalent to the circuit shown in FIG. 6. For example, a common electrode 20 may be formed in a drive integrated circuit (IC) so as to form a dot-matrix type sensor pattern and a common electrode capacitance (Cvcom).

A common voltage level is applied to the common electrode 20 alternating at a predetermined frequency. When a conductor such as a finger 25 gains access to the sensor pattern 10, the common electrode capacitance Cvcom is formed between the sensor pattern 10 and the common electrode 10, and the common electrode capacitance Cvcom may have a predetermined voltage level by the charged voltage. Here, since one end of the common electrode capacitance Cvcom is grounded to the common electrode 20, the electric potential of the sensor pattern 10 that is the other end of the common electrode capacitance Cvcom may vary by an alternating electric field applied to the common electrode 20. That is, the electric potential of the sensor pattern 10 undergoes voltage variations by the common electrode capacitance Cvcom.

Meanwhile, the aforementioned Ct and Cvcom are symbols that represent both the name and magnitude of a capacitor. For example, the symbol "Ct" means a capacitor named Ct and having a capacitance Ct in magnitude.

According to the embodiment shown in FIG. 7B, a display device 200 has a common electrode 220. The display device 200 may be formed in various forms. The common electrode 220 may be an electrode of a common voltage Vcom in a liquid crystal display (LCD), or may be one of other types of electrodes. Among a variety of display devices, the LCD has been illustrated in the embodiment of FIG. 7.

In the display device 200 shown in FIG. 7B, liquid crystal is sealed and filled between a lower-side thin film transistor (TFT) substrate 205 and an upper-side color filter 215, to thus have a structure of forming a liquid crystal layer 210. To seal the liquid crystal, the TFT substrate 205 and the color filter 215 are joined by sealants 230 at their outer portions. Although they are not shown, polarizing plates are attached on the top and bottom of the LCD panel, and besides optical sheets such as a back light unit (BLU) and a brightness enhancement film (BEF) are provided.

As shown, a substrate 50 of a touch screen panel is provided on top of the display device 200. As shown in FIG. 7B, the substrate 50 is attached to the upper portion of the display device 200 at the outer frame thereof, through the medium of an adhesive member 57 such as a double adhesive tape (DAT), and an air gap 58 is formed between the substrate 50 and the display device 200.

Figure 5:
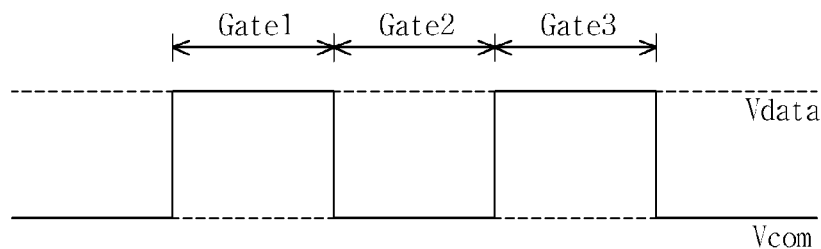
FIG. 5 is a waveform diagram illustrating a common voltage waveform of a liquid crystal display device.

A common voltage level alternating at a predetermined frequency is applied to the common electrode 220 of the display device 200 as shown in FIG. 7B. For example, a small or medium-sized LCD has a common electrode 220 whose common voltage alternates as shown in FIG. 5. As another example, in the case that the common voltage of the common electrode 220 remains constant, or the common electrode 220 is grounded to the ground signal, a separate alternating voltage is applied to the common electrode 220. An example of applying an alternating voltage to the common electrode 220 will be described later in an embodiment that will be described.

Although it has been described with reference to FIGS. 7A and 7B, when an equivalent circuit of FIG. 6 is employed, according to the present invention, a level shift may be detected irrespective of a physical location of the common electrode 6.

Referring back to FIG. 6, the charging unit 12 is a unit for selectively supplying a charging signal to the sensor pattern 10 at a required point in time. The charging unit 12 is a linear device such as a 3-terminal switching device that performs a switching operation in accordance with a control signal supplied to an on/off control terminal, or an operational amplifier (OP-AMP) that supplies a signal according to a control signal. For example, the charging unit 12 is any one of a relay switch, a MOS (Metal Oxide Semiconductor) switch, a BJT (Bipolar Junction Transistor) switch, a FET (Field Effect Transistor) switch, a MOSFET (Metal Oxide Semiconductor Field Effect Transistor) switch, an IGBT (Insulated Gate Bipolar Transistor) switch, and a TFT (Thin Film Transistor) switch. For instance, the relay switch is a device in which a voltage or current applied to an input terminal thereof is output without loss when the current is applied to a control terminal thereof. The BJT switch is a device in which a certain amount of amplified current flows from a collector terminal thereof to an emitter terminal thereof when a current is applied to a base terminal thereof at a state where a current higher than a threshold voltage of the base terminal has been applied to the base terminal. In addition, the TFT switch is a switching device that is used in a pixel unit for a LCD or AMOLED, and includes a gate terminal that is a control terminal, and a drain terminal and a source terminal that are input and output terminals, respectively, in which the TFT switch is energized when a voltage higher than a threshold voltage higher than a voltage applied to the source terminal is applied to the gate terminal, and thus a current depending on the magnitude of a voltage applied to the gate terminal flows from the input terminal to the output terminal. Besides, a variety of devices such as an operational amplifier (OP-AMP) having an enable terminal and a disable terminal, and a flip-flop may be used as the charging unit 12.

Referring to the circuit diagram of FIG. 6, the touch capacitance Ct and the common electrode capacitance Cvcom acting on the sensor pattern 10 are connected to the output terminal of the charging unit 12. Thus, when a charging signal such as any voltage or current is applied to the input terminal of the charging unit 12 at a state where the charging unit 12 has been turned on, the touch capacitance Ct and the common electrode capacitance Cvcom are charged. Here, an unshown parasitic capacitance Cp may be also charged.

Thereafter, if the charging unit 12 is turned off, the charged signal is isolated unless the signals charged in the touch capacitance Ct and the common electrode capacitance Cvcom are discharged in a separate way. To stably isolate the charged signals, the input end of the level shift detector 14 has a high-impedance (or Hi-z) state as shown in FIG. 6. If a touch input is observed while discharging the signals charged in the touch capacitance Ct and the common electrode capacitance Cvcom, the charged signals are isolated in the other ways, or the signals are quickly observed at the time of discharge initiation, there is no need to inevitably have a high-impedance (or Hi-z) state at the input end of the level shift detector 14.

The level shift detector 14 detects whether or not a signal level of the sensor pattern 10 is shifted. Preferably, the level shift detector 14 detects whether or not a level shift occurs in a voltage variation of the sensor pattern 10 at the time of occurrence of a touch input (that is, when Ct is added in parallel to Cvcom), in contrast to a voltage variation of the sensor pattern 10 at the time of non-occurrence of a touch input (that is, when Ct is not formed), to thus acquire a touch signal. The level shift detector 14 may have a wide variety of devices or circuit configuration. In the embodiments to be described later, examples in which a switching device and a differential amplifier are used as the level shift detector 14 will be described, but the configuration of the level shift detector 14 is not limited thereto.

Referring to FIGS. 7A and 7B, the touch capacitance Ct is formed between the finger 25 and the sensor pattern 10, and the common electrode capacitance Cvcom is formed between the sensor pattern 10 and the common electrode 20 or 220. In FIGS. 7A and 7B, portions shown in respective dotted lines are planarization layers 24 for protecting the sensor pattern 10. If a protection panel made of reinforced glass is attached on the upper surface of the substrate 50, the planarization layers 24 may be removed.

The voltage variation of the sensor pattern 10 due to the common electrode capacitance Cvcom at the time of non-occurrence of a touch input is determined by following Equation 1.

$$\Delta Vsensor = \pm (VcomH - VcomL)\frac{Cvcom}{Cvcom + Cp} \quad 1$$

Since Ct is added in parallel to Cvcom at the time of occurrence of a touch input, the voltage variation of the sensor pattern 10 is determined by following Equation 2.

$$\Delta Vsensor = \pm (VcomH - VcomL)\frac{Cvcom}{Cvcom + Cp + Ct} \qquad 2$$

In Equations 1 and 2, ΔVsensor is a voltage variation in the sensor pattern 10, VcomH is a high level voltage of the common electrode 20, VcomL is a low level voltage of the common electrode 20, Cvcom is a common electrode capacitance, Cp is a parasitic capacitance, and Ct is a touch capacitance.

The level shift detector 14 detects a level shift in the sensor pattern 10 by using Equations 1 and 2, which will be described below in detail.

In Equations 1 and 2, VcomH and VcomL are values that may be easily set up. Cvcom may be obtained from following Equation 3.

$$Cvcom = \varepsilon \frac{S1}{D1} \qquad 3$$

In Equation 3, ∈ may be obtained from the dielectric constant (or permittivity) of the substrate 50. For example, since the specific dielectric constant is 3 to 5, in the case of glass, the dielectric constant of the substrate 50 may be obtained by multiplying the specific dielectric constant of glass by the dielectric constant of vacuum. S1 is an opposite area between the sensor pattern 10 and the common electrode 20, which will be easily calculated. In the case that the common electrode 20 or 220 is formed over the entire surface of the substrate 50 as shown in FIGS. 7A and 7B, the opposite area S1 is determined by an area of the sensor pattern 10. In addition, D1 is a distance between the sensor pattern 10 and the common electrode 20, and thus corresponds to thickness of the substrate 50.

As seen, Cvcom is a value that may be easily obtained and set.

The touch capacitance Ct may be obtained from following Equation 4.

$$Ct = \varepsilon \frac{S2}{D2} \qquad 4$$

In Equation 4, the permittivity ∈ may be obtained from a medium between the sensor pattern 10 and the finger 25. If the protection panel made of reinforced glass or the planarization layer 24 is attached on the top surface of the substrate 50, in FIGS. 7A and 7B, the permittivity ∈ can be obtained by multiplying the specific dielectric constant of the reinforced glass by the dielectric constant of vacuum. S2 is an opposite area between the sensor pattern 10 and the finger 25. If the finger 25 covers the entire surface of a certain sensor pattern 10. S2 corresponds to the area of the certain sensor pattern 10 that is covered with the finger 25. If the finger 25 covers part of a certain sensor pattern 10. S2 will be reduced by an area of the certain sensor pattern that is not covered with the finger 25. In addition, D2 is a distance between the sensor pattern 10 and the finger 25, and thus corresponds to thickness of the protection panel made of reinforced glass or the planarization layer 24 that is put on the upper surface of the substrate 50.

As described above, Ct is a value that can be easily obtained, and that can be also set up by using the protection panel or the planarization layer 24 that is put on the upper surface of the substrate 50. In particular, according to the Equation 4, since Ct is proportional to the opposite area between the finger 25 and the sensor pattern 10, a touch share of the finger 25 with respect to the sensor pattern 10 can be calculated from the Ct.

The level shift detector 14 detects whether or not a level shift occurs in a voltage variation clue to the Equation 2 in comparison with a voltage variation due to the Equation 1. The level shift detector 14 may include an amplifier to amplify a signal from the sensor pattern 10, an analog to digital converter (ADC), a voltage to frequency converter (VFC), a flip-flop, a latch, a buffer, a transistor (TR), a thin film transistor (TFT), a comparator, etc., or a combination of these components.

Figure 8:
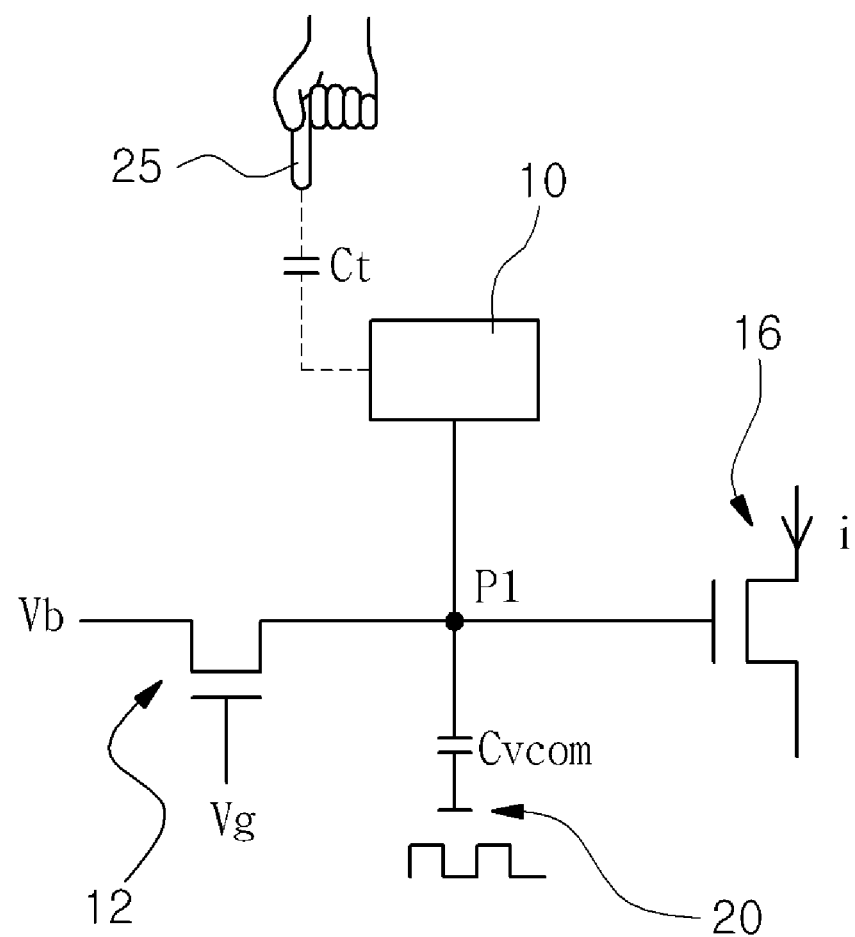
FIG. 8 is a circuit diagram showing an example of a touch detecting device.

FIG. 8 is a circuit diagram showing an example of a touch detecting device. In the touch detecting device of FIG. 8, the level shift detector 14 comprises a signal detecting switching device 16. As an example, the signal detecting switching device 16 is a thin film transistor (TFT). Referring to FIG. 8, the on/off control terminal of the signal detecting switching device 16 is connected to the sensor pattern 10. Thus, the current "i" flowing through the input/output terminals of the signal detecting switching device 16 is controlled by the electric potential of the sensor pattern 10. As shown, if a junction between the sensor pattern 10 and the on/off control terminal of the signal detecting switching device 16 is P1, the electric potential V_P1 of the junction P1 is affected by Cvcom and Ct as expressed in the Equations 1 and 2.

As shown, one end of the common electrode capacitance Cvcom is alternated so that the electric potential may have a certain height by the common electrode 20. Therefore, the electric potential V_P1 is changed in synchronization with an alternating voltage of the common electrode 20 at a state where Cvcom has been charged. Thereafter, the supply of the charging voltage and the alternation of the common voltage are continuously performed, and thus V_P1 will have the voltage variation of the Equation 1. If a touch input occurs, Ct is added in parallel to Cvcom. In addition, the level shift is accomplished to reduce the voltage variation.

Figure 9:
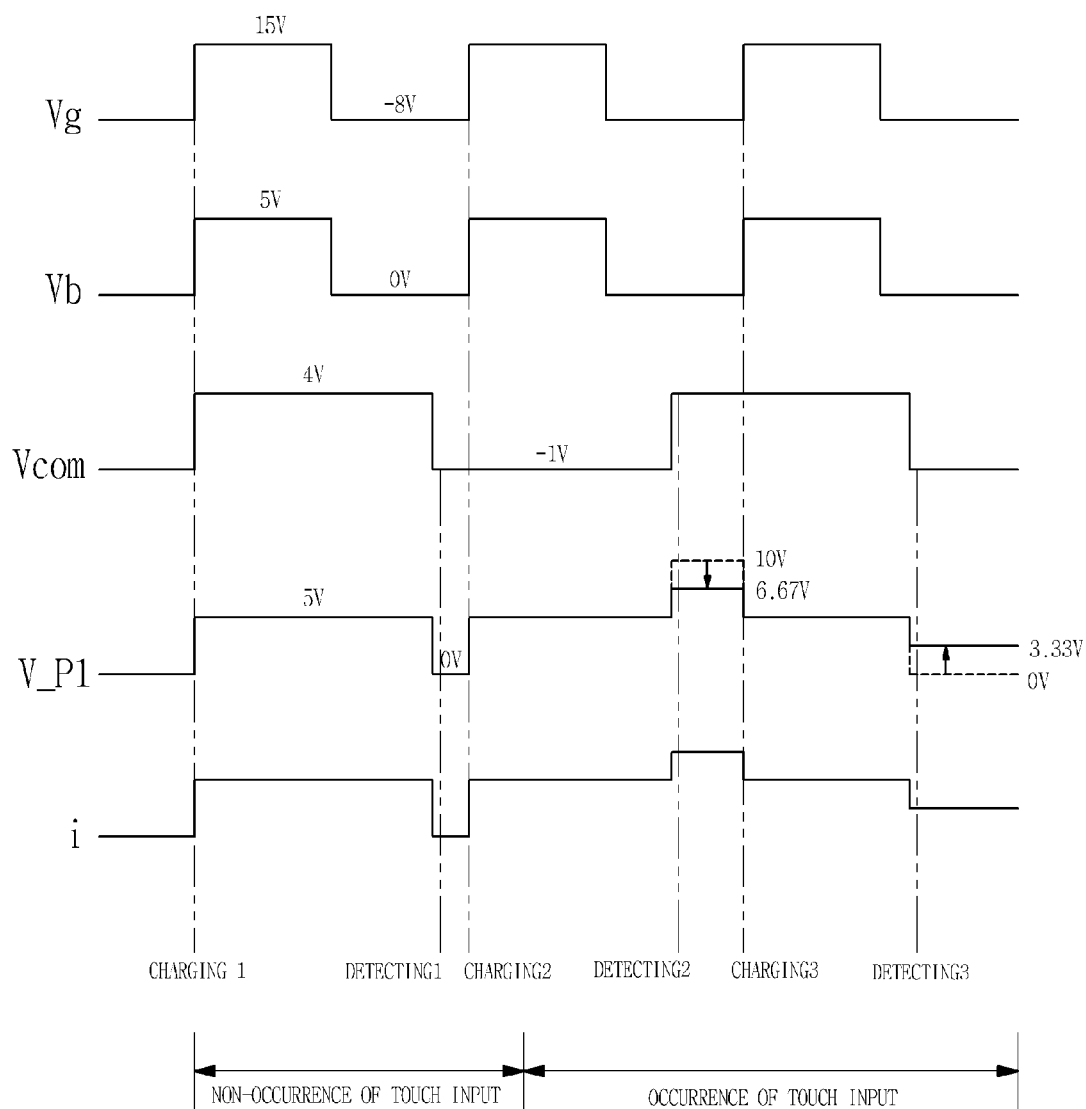
FIG. 9 is a waveform diagram illustrating a process of detecting a touch signal in the embodiment of FIG. 8.

FIG. 9 is a waveform diagram illustrating a process of detecting a touch signal in the embodiment of FIG. 8. Referring to FIG. 9, a method of detecting a touch signal by using a level shift will be described as follows.

First, if the charging unit 12 is turned on, the charging signal Vb is supplied to thus charge the capacitor Cvcom. Meanwhile, if the charging unit 12 is turned off, the gate input terminal of the signal detecting switching device 16 is always in a Hi-z state, that, is, in a high impedance state, and thus the charges stored in the capacitor Cvcom is maintained in an isolated state. Accordingly, the potential of the sensor pattern 10 is also maintained. In this example, the turn-on voltage of the charging unit 12 is about 15V and the turn-off voltage is about −8V. If the on/off voltages applied to the gate of the charging unit 12 are set to have a sufficient difference, a more stable on/off characteristic may be obtained.

As an example, about 5V is applied as the charging signal Vb. The charging signal Vb is synchronized with the gate signal Vg. Thus, the charging signal Vb is given as about 0V when the gate is turned off, or is maintained to have an electric potential difference of about 5V or higher in comparison with the gate voltage so that the voltage applied to the gate maintains a sufficient turn-off state. The common voltage of the common electrode 20 is given as about 4V at the high level, and about −1V at the low level. As shown, after the charging operation has been first performed, the detecting operation is performed at the rising time and the falling time of the common voltage. However, the charging operation and the detecting operation do not have to be necessarily sequentially performed.

For example, by shortening the gate turn-off time of the charging unit 12, Cvcom may be always maintained in a charged state. Otherwise, by completely blocking a discharge path, Cvcom may be maintained in a charged state. The charging operation need not be necessarily performed before performing the detecting operation. The current consumption may be reduced by these actions.

In addition, the detecting operation may be performed only at the rising time of the common voltage, or only at the falling time of the common voltage. Otherwise, the detecting operation may be also performed every few cycles of the common voltage.

In the example of FIG. 9, if charging 1 is performed, the electric potential V_P1 of the junction P1 rises up along a gradually slow curve and becomes about 5V. In the waveform of FIG. 9, influences due to the charging characteristics, discharging characteristics, and noise were ignored. Thereafter, although Vg is turned off, the charges stored in the common electrode capacitance Cvcom are maintained in an isolated state, and thus the potential of V_P1 is maintained at about 5V.

After charging 1 has been performed, detecting 1 is performed at the falling time of the common voltage. Preferably, detecting 1 is performed immediately after the downturn of the common voltage or after a predetermined time has elapsed. Since a touch input has not occurred as shown in the lower end of FIG. 9 when detecting 1 is performed, the voltage variation expressed in the Equation 1 occurs. If it is assumed that Cp is a negligibly small value compared to Cvcom, detecting 1 is performed at the falling time of the common voltage, and thus the value of ΔVsensor in the Equation 1 is "−{4−(−1)}*1," that is, −5V. Thus, the electric potential V_P1 at the junction P1 varies from 5V to 0V. In addition, the current flowing in the input and output terminals of the signal detecting switching device 16 is linked to the electric potential at the junction P1 as shown in the waveform of FIG. 9, and thus falls down.

Figure 10:
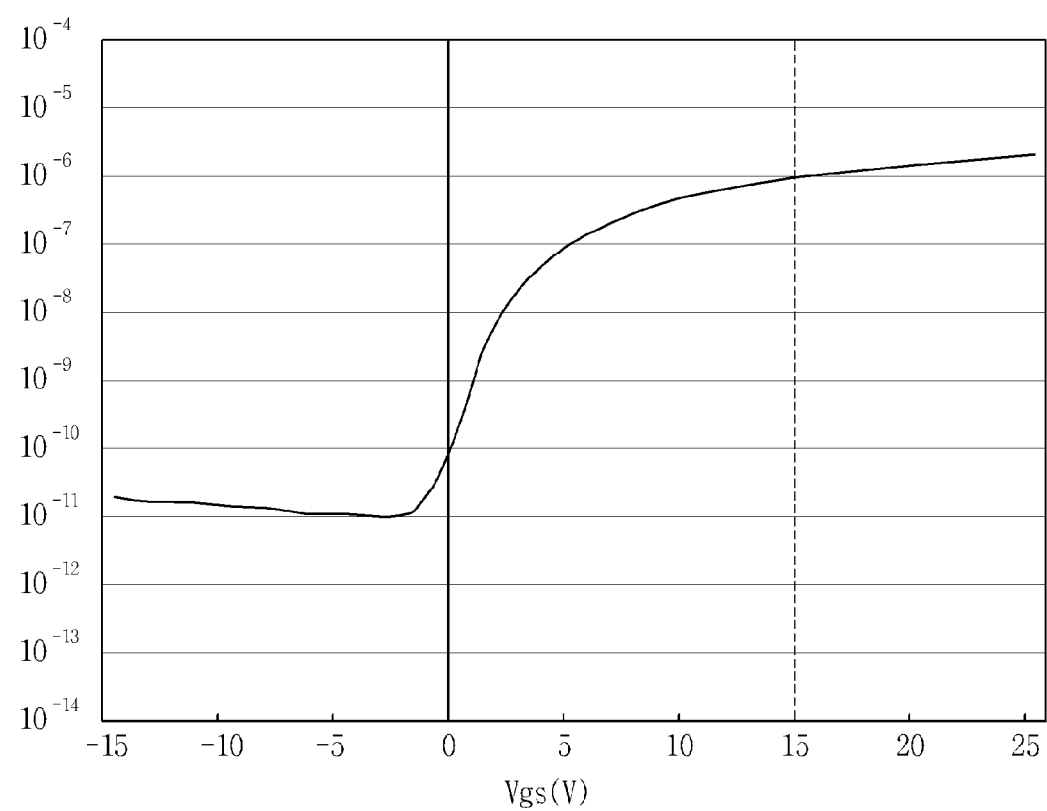
FIG. 10 is a graph showing characteristics of an output current with respect to a gate voltage of a thin film transistor (TFT)

If a thin film transistor (TFT) is used as the signal detecting switching device 16, a high current variation may be obtained in comparison with the variation of the gate voltage. FIG. 10 is a graph showing characteristics of an output current with respect to a gate voltage of a thin film transistor (TFT). Referring to FIG. 10, an approximately 1,000-fold difference appears between the output currents respectively when the gate voltage is 5V and 0V. Thus, the voltage variation at the junction P1 may be read very easily. In addition, if a comparator is added in parallel to the input or output end of the signal detecting switching device 16, and a signal corresponding to a voltage level at the junction P1 at the time of non-occurrence of a touch input is applied as a reference signal of the comparator, a level shift at the junction P1 at the time of occurrence of a touch input may be also detected more easily.

In contrast to the above, if a detecting operation is performed at the rising time of the common voltage at a state where no touch inputs occur, the value of ΔVsensor in the Equation 1 is "{4−(−1)}*1," that is, 5V. Thus, the electric potential V_P1 at the junction P1 varies from 5V to 10V.

Referring to FIG. 9, after detecting 1 has been performed, charging 2 is also performed. In addition, as mentioned earlier, the electric potential V_P1 at the junction P1 rises up back to 5V. FIG. 9 shows occurrence of a touch input after charging 2 has been performed.

After a touch input, has occurred, detecting 2 is performed at the rising time of the common voltage. Here, since the touch input has occurred. Ct is formed and functions between the finger 25 and the sensor pattern 10. As described earlier, Ct may be designed under a variety of conditions. If a distance between the finger 25 and the sensor pattern 10, and a permittivity of a medium filled between the finger 25 and the sensor pattern 10 are the same as a distance between the sensor pattern 10 and the common electrode 20 and a permittivity of a medium filled between the sensor pattern 10 and the common electrode 20, and if the finger 25 covers the entire sensor pattern 10. Cvcom and Ct will have an identical value. Thus, since detecting 2 is performed at the rising time of the common voltage, and thus the value of ΔVsensor that is a voltage variation at the junction P1 in the Equation 2 is "{4−(−1)}*½," that is, 2.5V. Thus, the electric potential V_P1 at the junction P1 varies from 5V to 7.5V. In addition, the current flowing in the input and output terminals of the signal detecting switching device 16 is linked to the electric potential at the junction P1 as shown in the waveform of FIG. 9, and thus rises up.

Here, when a touch input occurs as shown in the waveform of FIG. 9, it can be seen that the voltage level is shifted from 10V to 7.5V, in comparison with non-occurrence of a touch input. Thus, a touch signal may be acquired by detecting the level shift.

After detecting 2 has been performed, charging 3 is performed and then detecting 3 is performed at the falling time of the common voltage to detect a level shift. In this case, if no touch has occurred, V_P1 falls down to 0V, but if a touch has occurred, V_P1 falls down to 2.5V. In other words, in the case of occurrence of a touch input, the signal at V_P1 is level-shifted downwards at the rising time of the common voltage, but upwards at the falling time of the common voltage.

Meanwhile, if the finger 25 partially covers the sensor pattern 10, the opposite area S2 between the finger 25 and the sensor pattern 10 becomes small, and thus Ct also becomes small in Equation 4. Thus, the size of the level shift will become also small in the waveform of FIG. 9. In other words, a touch share of the finger 25 with respect to the sensor pattern 10 may be computed by detecting the size of the level shift. Although the size and resolution of the sensor pattern 10 are limited, a touch resolution may be increased through the computation of the touch share of the finger 25 with respect to the sensor pattern 10 based on the detection of the level shift. In addition, it is possible to draw a picture of a high resolution by detecting microscopic fluctuations of touch coordinates, and using a finger or other touch input instrument.

Figure 11A:
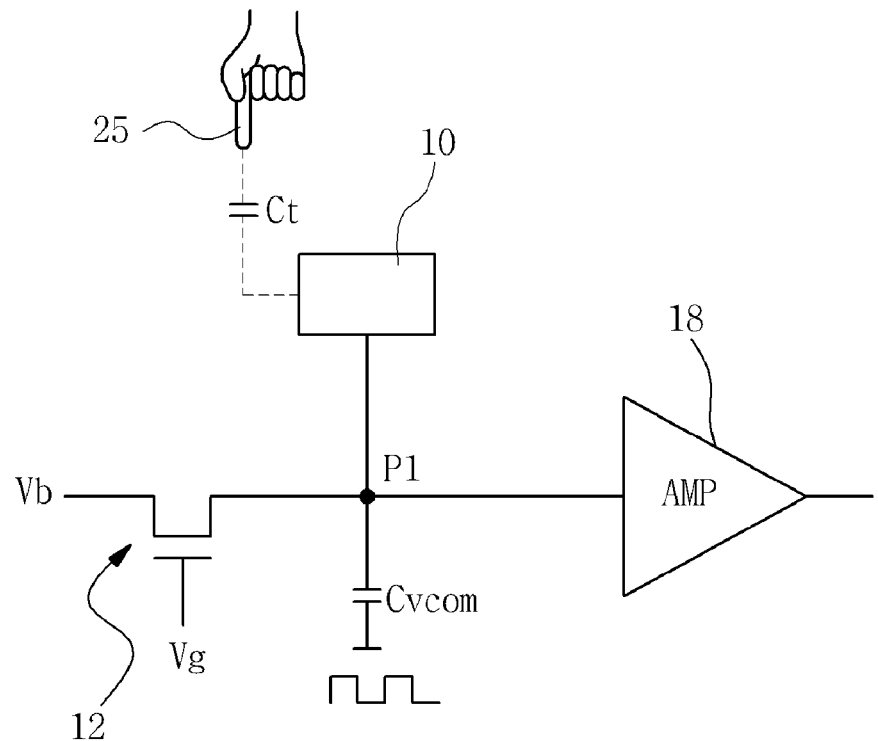
FIGS. 11A and 11B are circuit diagrams showing another example of a touch detecting device.
Figure 11B:
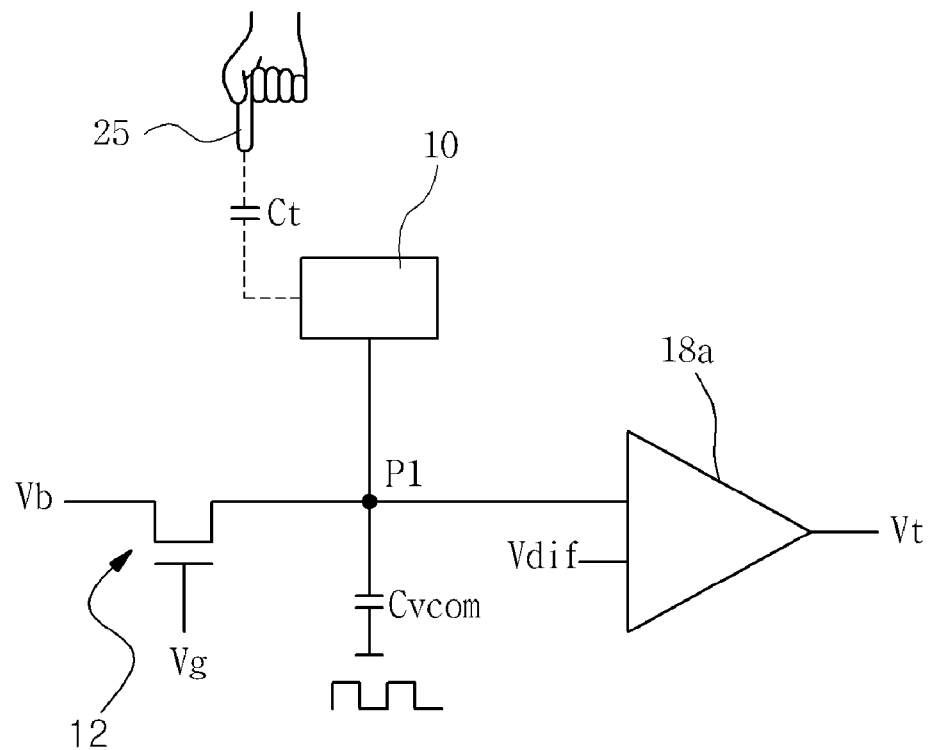

FIGS. 11A and 11B are circuit diagrams showing other examples of a touch detecting device, which show other examples of the level shift detector 14 of FIG. 6. Referring to FIG. 11A, the level shift detector 14 includes an amplifier 18 whose input terminal is connected to the sensor pattern 10. Since the input terminal of the amplifier 18 is also maintained in the Hi-z state that is the high impedance state, the signal at the junction P1 may be stably isolated.

In the embodiment of FIG. 11A, the electric potential at the junction P1 varies in voltage due to Cvcom and Ct, which is the same as the embodiment of FIG. 8. However, the amplifier 18 is used as a device for detecting the level shift. The amplifier 18 amplifies the signal from the sensor pattern 10. Accordingly, since the size of a level shift due to occurrence of a touch input is amplified and output, the touch signal may be obtained stably.

In the embodiment of FIG. 11B, a differential amplifier 18a is used as the amplifier 18. The differential amplifier 18a differentially amplifies the signal from the sensor pattern 10 according to an inverted or non-inverted differential input voltage Vdif. Here, Vdif may be externally controlled. Vdif may be a signal corresponding to the charging signal applied through the charging unit 12. Preferably, Vdif is the signal corresponding to the voltage level at the junction P1 at the time of non-occurrence of a touch input. As an example, in the embodiment of FIG. 9. Vdif is 10V in an interval where the common voltage is high, but 0V in an interval where the common voltage is low.

Likewise, if Vdif corresponds to the voltage level at the junction P1 at the time of non-occurrence of a touch input, the differential amplifier 18a amplifies only the value of the level shift at the time of occurrence of a touch input and outputs the amplified result. Thus, a little more clean and reliable touch signal may be obtained.

In order to determine Vdif, there is a need to extract the voltage level at the junction P1 at the time of non-occurrence of a touch input. In addition, in order to obtain a touch signal respectively at the rising time and falling time of the common voltage level. Vdif is also determined preferably by separately extracting the voltage level at the junction P1 at the time of non-occurrence of a touch input respectively at the rising time and falling time of the common voltage level. Vdif may be determined and entered in a step of manufacturing a touch screen panel. In addition, at the time when power is initially turned on, or when a touch input does not periodically occur, the voltage level at the junction P1 may be detected.

Figure 12:
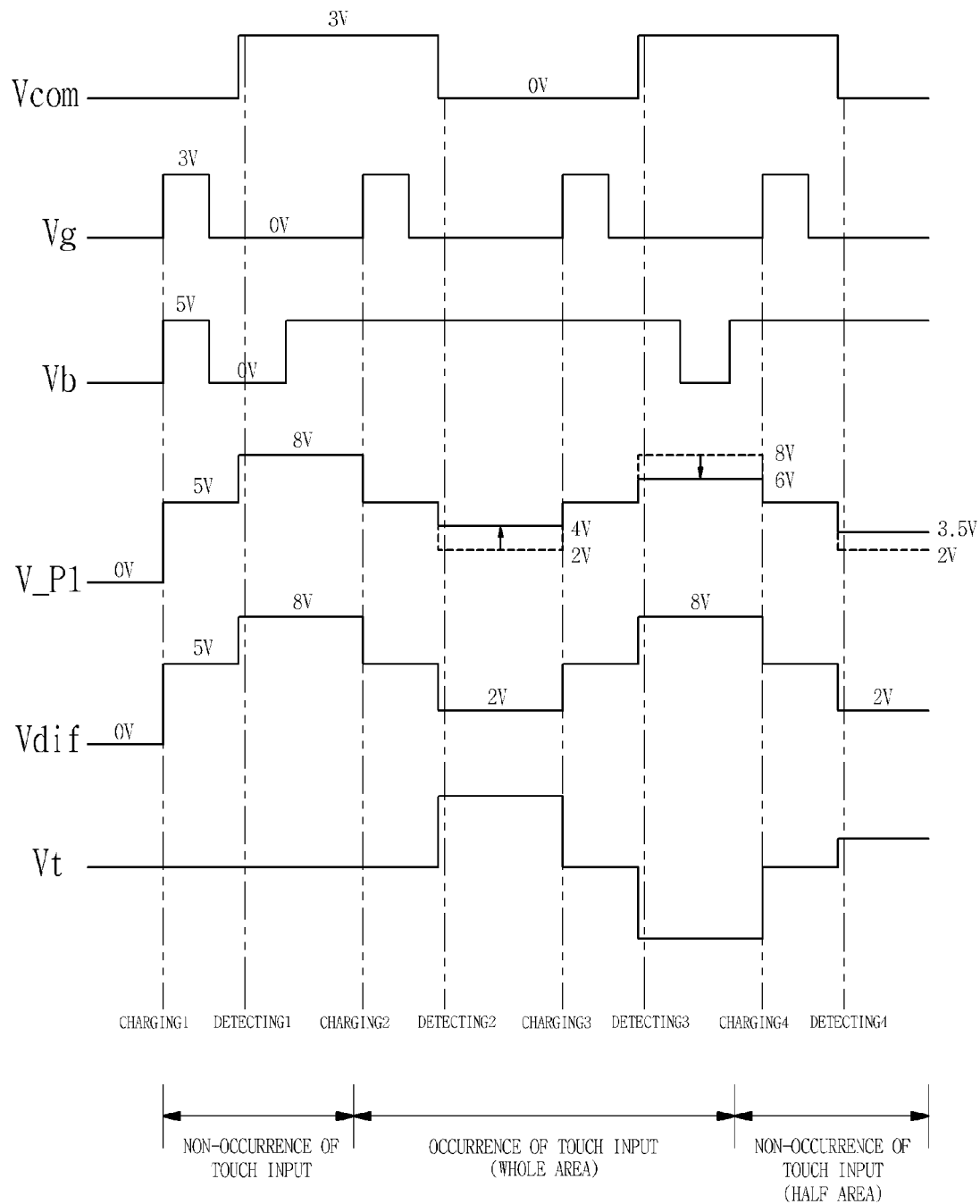
FIG. 12 is waveform diagram illustrating a process of detecting a touch signal in the embodiment of FIG. 11B.

FIG. 12 is waveform diagram illustrating a process of detecting a touch signal in the embodiment of FIG. 11B. Referring to FIG. 12, when a differential amplifier 18a is used as the level shift detector 14, an example of detecting a signal will be described below.

In FIG. 11A, the turn-on voltage of the gate voltage Vg of the charging unit 12 is 3V and the turn-off voltage thereof is 0V. The charging signal Vb is applied as 5V. The common voltage of the common electrode 20 is given as 3V at the high level and 0V at the low level. The larger the difference in the height, of the common voltage is, the better it is. However, since the differential amplifier 18a is used in the present embodiment, the level shift may be easily detected even through the difference in the height of the common voltage is small. Detecting is performed after the charging operation even in the embodiment of FIG. 12. In addition, it has been assumed that Cvcom and Ct equal, and Cp is negligible in value. When the embodiment of FIG. 12 is described, the detailed description of the same portion as that of the FIG. 9 embodiment will be omitted.

When charging 1 is performed, the electric potential V_P1 at the junction P1 is maintained as 5V. In FIG. 12, after charging 1 has been performed, detecting 1 is performed at the rising time of Vcom. Detecting 1 occurs immediately after the rising time of Vcom or after a predetermined period of time has elapsed. Here, since a touch input does not occur, the value of ΔVsensor in the Equation 1 is "(3−0)*1," that is, 3V. Thus, the electric potential V_P1 rises up to 8V. Vdif is also given as 8V at the time of non-occurrence of a touch input. Since the voltage level of V_P1 and Vdif are ideally same at the time of non-occurrence of a touch input, the output Vt of the differential amplifier 18a does not nearly occur. If there is an influence due to noise, etc., Vt is output as a very weak signal.

As shown in FIG. 12, it is assumed that a touch input has occurred immediately before charging 2 is performed (or charging 2 is being performed), and a finger 25 has covered the whole area of a sensor pattern 10.

When charging 2 has been performed, the voltage level at the junction P1 falls back down to 5V that is the charging voltage. In addition, since a touch input has occurred and detecting 2 is performed at the falling time of Vcom. V_P1 varies by "−(3−0)*½" according to Equation 2. That is, it can be seen from detecting 2 that V_P1 is 3.5V and a level shift of 1.5V has occurred, in comparison with non-occurrence of a touch input. In this case, Vdif of the differential amplifier 18a corresponds to the value of V_P1 at the time of non-occurrence of a touch input, and thus varies by "−(3−0)*1" according to Equation 1 to have a value of 2V. Thus, the output Vt of the differential amplifier 18a amplifies 1.5V that is the difference between two inputs V_P1 and Vdif and outputs the amplified result. Substantially, the value of the level shift voltage of 1.5V is a value that may be easily recognized even at a low amplification factor. Furthermore, even if noise or a value of the parasitic capacitance Cp largely acts on at the time of detecting a touch signal, a high value of Vt may be obtained at the time of occurrence of a touch input by appropriately selecting amplification factor of the differential amplifier 18a.

After detecting 2 has been preformed, charging 3 is performed, and thus V_P1 will return to 5V. In addition, since a touch input has occurred at the rising time of Vcom at the time of detecting 3, V_P1 varies by "(3−0)*½" according to Equation 2. That is, V_P1 is 6.5V and thus a level shift of −1.5V has occurred in comparison with non-occurrence of a touch input. Thus, V_P1 of 6.5V is differentially amplified on the basis of Vdif of 8V as at the time of detecting 2, to thus acquire Vt. As a result, a touch signal is acquired from the differential amplification.

As shown in FIG. 12, it is assumed that a finger 25 has moved immediately before charging 4 is performed (or charging 4 is being performed) and a touch share of the finger 25 with respect to the sensor pattern 10 has been reduced to ½.

After detecting 4 has been preformed, V_P1 will return back to 5V. In addition, a touch input is detected at the time of performing detecting 4. In this case, since the finger 25 occupies ½ of the area of the sensor pattern 10, the opposite area S2 is reduced by ½ in Equation 4. Thus, Ct has a value of "Cvcom*½." When the value of "Cvcom*½" is substituted in Equation 2, the value of ΔVsensor is "−(3−0)*1/1.5" at the time of performing detecting 4. Thus, as shown, V_P1 has a value of 3V. This means that a level shift of 1V has occurred in comparison with 2V at the time of non-occurrence of a touch input. The differential amplifier differentially amplifies 1V.

To summarize the above description, V_P1 and Vdif are ideally same. Thus, Vt is output as only a weak signal which corresponds to noise. If a touch input occurs at a touch share of 100% with respect to a certain sensor pattern 10. V_P1 is level-shifted by 1.5V or −1.5V. In addition, if a touch input occurs at a touch share of 50% with respect to a certain sensor pattern 10, V_P1 is level-shifted by 1V or −1V. In other words, a touch signal may be obtained by detecting a level shift from the output of the differential amplifier 18a. Of course, a touch share of a finger 25 or a touch input instrument having a similar characteristic to the finger 25 may be very easily calculated.

Meanwhile, in FIG. 12, the charge signal Vb has been applied as 5V in a turn-on interval of the charging unit 12. However, the charging signal Vb may be provided with two voltage levels rather than a single voltage level. For example. Vb is provided with 8V before the falling time of the common voltage Vcom, and is provided with 2V before the rising time of Vcom. As described above, if Vb varies depending on the rising time of Vcom and the falling time of Vcom, V_P1 at the time of non-occurrence of a touch input may be maintained as a constant voltage irrespective of the rising time of Vcom and the falling time of Vcom. As a result, it is helpful to maintain a withstanding voltage at the time of manufacturing drive integrated circuits (Ics). At the falling time of Vcom, Vb varies by −3V in comparison with the charging voltage of 8V and becomes 5V, and at the rising time of Vcom, Vb also varies by 3V in comparison with the charging voltage of 2V and becomes 5V.

As described above, if the charging voltage is set, the width of voltage variation of V_P1 may be reduced, and the detecting range is also reduced. V_P1 is 5V at the time of non-occurrence of a touch input, and V_P1 is level-shifted by 1.5V up and down on the basis of 5V at the time of occurrence of a touch input.

In the above description, it has been assumed that Cp in Equations 1 and 2 is a small value negligible compared to Cvcom. Since the sensor pattern 10 and the common electrode 20 are actually formed on both sides of the substrate 50, the external noise and the parasitic capacitance Cp are of relatively small values. In some environments, however, the parasitic capacitance Cp may act greatly. For example, if Cvcom, Ct, and Cp are all of 1 pF, when the difference in the height of the common voltage Vcom is 3V, the value of ΔVsensor is "3*½" at the time of non-occurrence of a touch input, and "3*⅓" at the time of occurrence of a touch input. As being the case, differently from the case that the level shift of 1.5V has occurred depending on the occurrence of the touch input in the above description, the level shift of 0.5V will occur. 500 mV is a value that can be very easily detected by the differential amplifier 18a, and that can be easily recognized even though the size of the level shift becomes several tens of millivolts (mV) as a ratio of Cp is further increased.

Meanwhile, Cp may vary for each of the sensor patterns 10. For example, it is very difficult to uniformly design position of each of the sensor patterns 10, wire length, and other external factors, for each sensor pattern 10. In addition, Cvcom may vary for each sensor pattern 10. If the size of the level shift is great, such deviations may be ignored, but as the size of the level shift is smaller, such a deviation for each sensor pattern 10 becomes a value that cannot be negligible.

Figure 13:
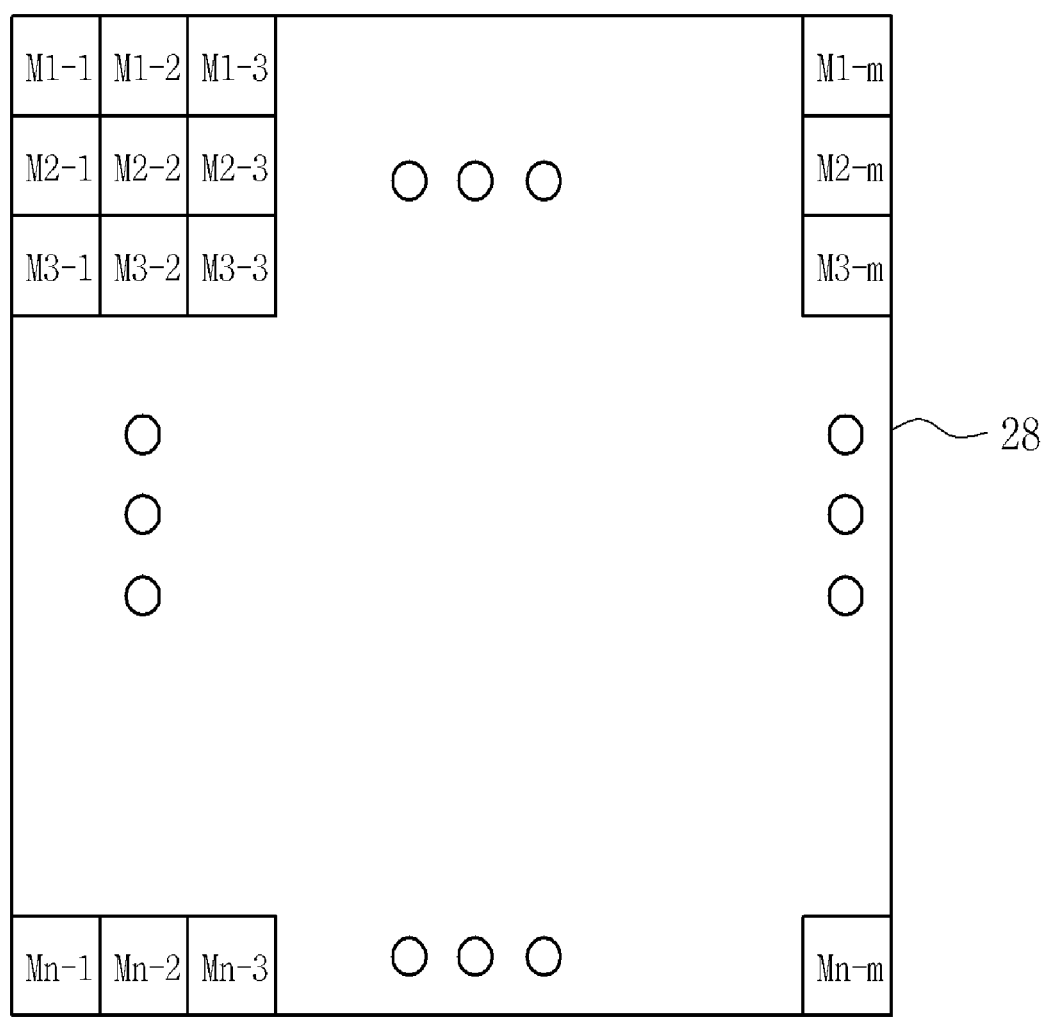
FIG. 13 is a schematic block diagram showing an example of a memory unit.

In order to solve these problems, a memory unit 28 to store the output signal of the differential amplifier 18a when a touch input does not occur for each sensor pattern 10 may be further included in a drive IC 30 (see FIG. 20) as shown in FIG. 13. The output signal output from the differential amplifier 18a and stored in the memory unit 28 is a value based on a unique Cp of each sensor pattern 10, and may vary for each sensor pattern 10.

For example, if the sensor patterns 10 are scanned immediately after power is applied to the sensor patterns 10, the output of the differential amplifier 18a may be obtained at a state where a touch input does not occur. If a deviation in the output of the differential amplifier 18a is large for each sensor pattern 10, the output of the differential amplifier 18a is ignored. Then, the output of differential amplifier 18a at the time of non-occurrence of a touch input may be extracted. In addition, the output of differential amplifier 18a at the time of non-occurrence of a touch input may be stored in the memory unit 28 at a step of shipping from a manufacturer. The memory unit 28 is additionally provided and also stores a value when a touch input occurs. In addition, the drive IC 30 may compare a value in an identical cell with a previous value therein, and may judge that a touch input has occurred when the value in the identical cell varies by a preset reference value or higher.

Referring to FIG. 13, when the sensor pattern 10 is arranged in the form of a dot-matrix pattern, and have a resolution of m*n, the memory unit 28 consists of a table with m rows and n columns. For example, the output of differential amplifier 18a that has occurred at the time of non-occurrence of a touch input and that has been assigned at the uppermost-leftmost corner of the sensor pattern 10 may be stored in an address of M1−1. In addition, the signal stored in the memory unit 28 is referenced when it is detected whether or not a touch input occurs at the uppermost-leftmost corner of the sensor pattern 10.

The value stored in each address of the memory unit 28 may be periodically calibrated. The periodic calibration may be carried out when power is applied to the device, as described above, or in a dormant state. As described above, if the output of differential amplifier 18a is stored in the memory unit 28, at the time of non-occurrence of a touch input for each sensor pattern 10) (or respectively separately at the time of non-occurrence and occurrence of a touch input), periodically calibrated, and referenced at the time of detecting a touch signal, the touch signal may be stably acquired even in the case that a unique Cp is assigned for each sensor pattern 10.

Figure 14A:
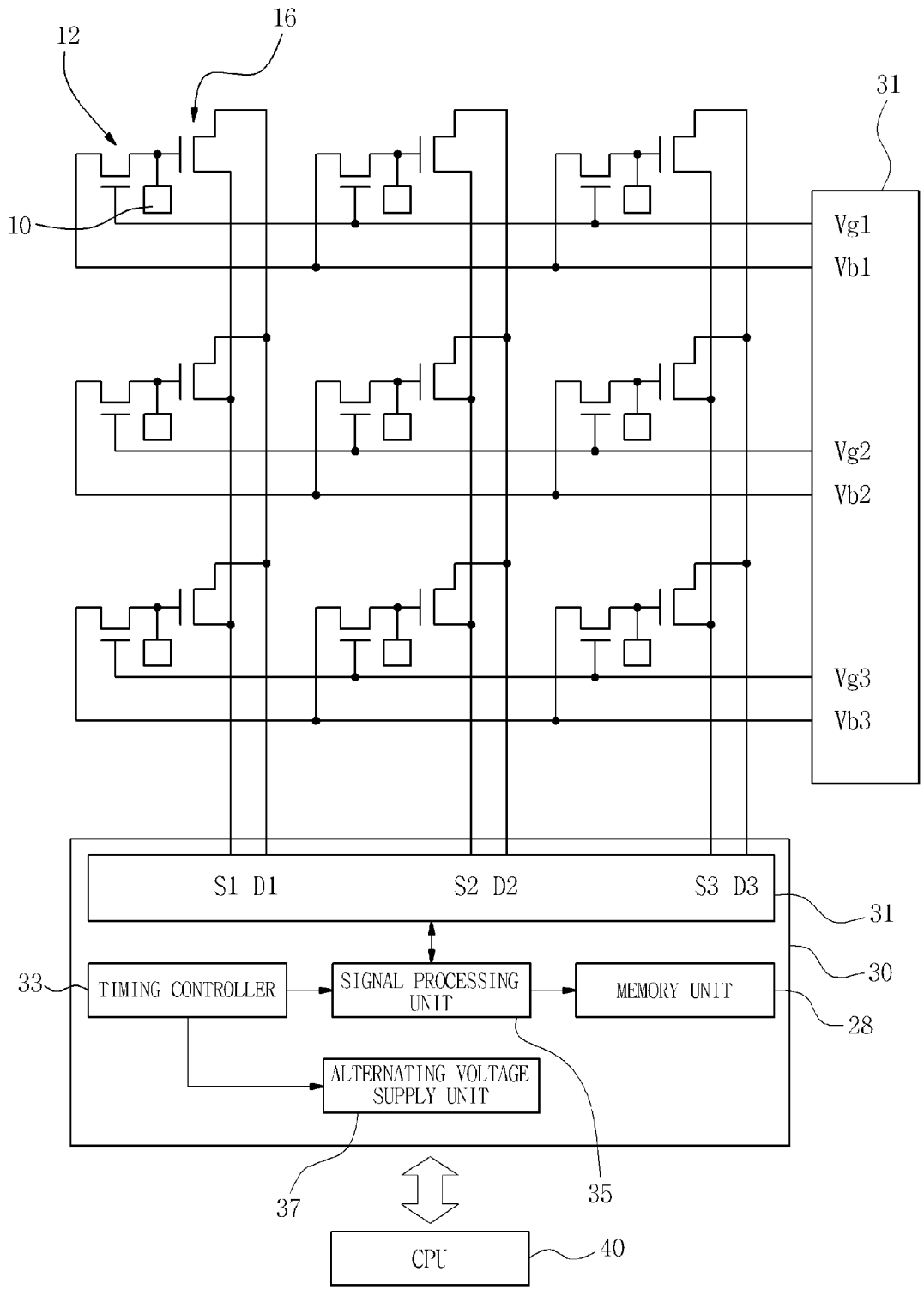
FIG. 14A is a schematic diagram showing a touch screen panel according to an embodiment of the present invention.

FIGS. 14A to 24 show embodiments of a touch screen panel according to the present invention, respectively. FIG. 14A shows an embodiment employing the above-described touch detecting device, in which the sensor pattern 10 is arranged in the form of a dot-matrix pattern.

Referring to FIG. 14A, the sensor pattern 10 is arranged in the form of a dot-matrix pattern, in which a charging unit 12 and a signal detecting switching device 16 are provided for each sensor pattern 10. The sensor pattern 10, the charging unit 12 and the signal detecting switching device 16 forms a unit cell. Such a unit cell is arranged in a matrix form on a glass substrate, or a light transmitting substrate 50.

The configuration of FIG. 14A is similar to that of a TFT substrate of a LCD. In addition, if TFTs are used as the charging unit 12 and the signal detecting switching device 16, a TFT substrate manufacturing process in a LCD manufacturing process may be used to manufacture a substrate 50. This allows for ease of mass production, stable quality, and low-cost manufacturing.

A configuration of the drive IC 30 is shown at the lower portion of FIG. 14A. The Drive IC 70 includes a signal transceiver 31, a timing controller 33, a signal processing unit 35, an alternating voltage supply unit 37, and a memory unit 28. In addition, a detecting signal obtained from the drive IC 30 is delivered to a central processing unit (CPU) 40. The CPU 40 may be a CPU of a display device, a main CPU of a computer device, or a CPU of a touch screen panel itself. For example, an 8 bit or 16 bit microprocessor may be built-in or embedded to process a touch signal. Although it is not shown in the drawing, a power supply may be further included in a system configuration in order to generate a high or low voltage of signals for detecting touch inputs.

The microprocessor embedded in the drive IC 30 may calculate touch input coordinates, to thus recognize gestures such as zoom, rotation, and move, and deliver data such as reference coordinates (or central point coordinates) and gestures to the main CPU. In addition, the microprocessor may calculate an area of a touch input to generate a zooming signal, calculate a strength of the touch input, and recognize only a user's desired GUI object (for example, only a GUI object whose area is frequently detected) in the case that a plurality of GUI objects are simultaneously touched, that is, the microprocessor may process data in various forms, and output the processed result.

The timing controller 33 generates a time divisional signal of several tens of milliseconds (ms), and the signal processing unit 35 transmits and receives signals to and from each sensor pattern 10 through the signal transceiver 31, respectively. The alternating voltage supply unit 37 applies a voltage level alternating at a predetermined frequency to the common electrode 20, depending on the time divisional signal of the timing controller 33. The frequency of the alternating voltage applied to the common electrode 20 is adjustable by adjusting, for example, a register.

As shown, the signal transceiver 31 supplies on/off control signals Vgn and charging signals Vbn for the charging unit 12. In addition, the signal transceiver 31 transmits and receives a touch detecting signal to and from the input and output terminals of the signal detection switching device 16, respectively. In addition, the on/off control signals Vgn are time-divided by the timing controller 33 and scanned and supplied for each line of the touch detecting device. The touch detecting signal Sn is received to the signal transceiver 31 at the rising time or falling time of common voltage Vcom, after Vbn has been supplied and thus the charging operation has been performed for each sensor pattern 10. As noted earlier, Sn may occur at the rising time and falling time of Vcom, respectively.

As mentioned with reference to FIG. 13, the memory unit 28 is used to correct a signal at the time of non-occurrence of a touch input in each sensor pattern 10, or to store a signal at the time of occurrence of a touch input, and has unique absolute addresses for each sensor pattern 10. In addition, reference values (or these reference values and values that are detected at the time of occurrence of a touch input) for correcting each sensor pattern 10 are stored in the respective absolute addresses.

As described above, the obtained coordinate values may be temporarily stored or the reference values at the time of non-occurrence of a touch input may be stored by using only one memory unit 28. Otherwise, a plurality of memory units are provided to thus separately store the reference values at the time of non-occurrence of a touch input and detected values at the time of occurrence of a touch input, respectively.

In the illustrated embodiment, the sensor pattern 10 has been illustrated as an example of a resolution of 3*3, but actually has a higher resolution. As a result, signals may be lost in the process of dealing with many signals. For example, in the case that the signal processing unit 35 is in a "busy" state, the touch detecting signal is not recognized and may be missed. The memory unit 28 prevents the loss of such a signal.

The signal processing unit 35 detects the touch signal, to then be temporarily stored in the memory unit 28. In addition, the signal processing unit 35 scans the entire active region 90 (see FIG. 16) and then judges whether or not a missing signal exists with reference to the memory unit 28. If touch coordinates are stored in the memory unit 28 although signals have been lost in the signal processing, the signal processing unit 35 processes the corresponding touch coordinates as normal inputs to then delete the memory unit 28 prior to next scanning.

As shown in the embodiment of FIG. 7A, the embodiment illustrated in FIG. 14A may be used in the case that the common electrode 20 is formed in the touch screen panel to apply the common voltage. As mentioned above, the common electrode 20 may not be physically formed in the touch screen panel, as long as an equivalent circuit of FIG. 6 may be satisfied.

Figure 14B:
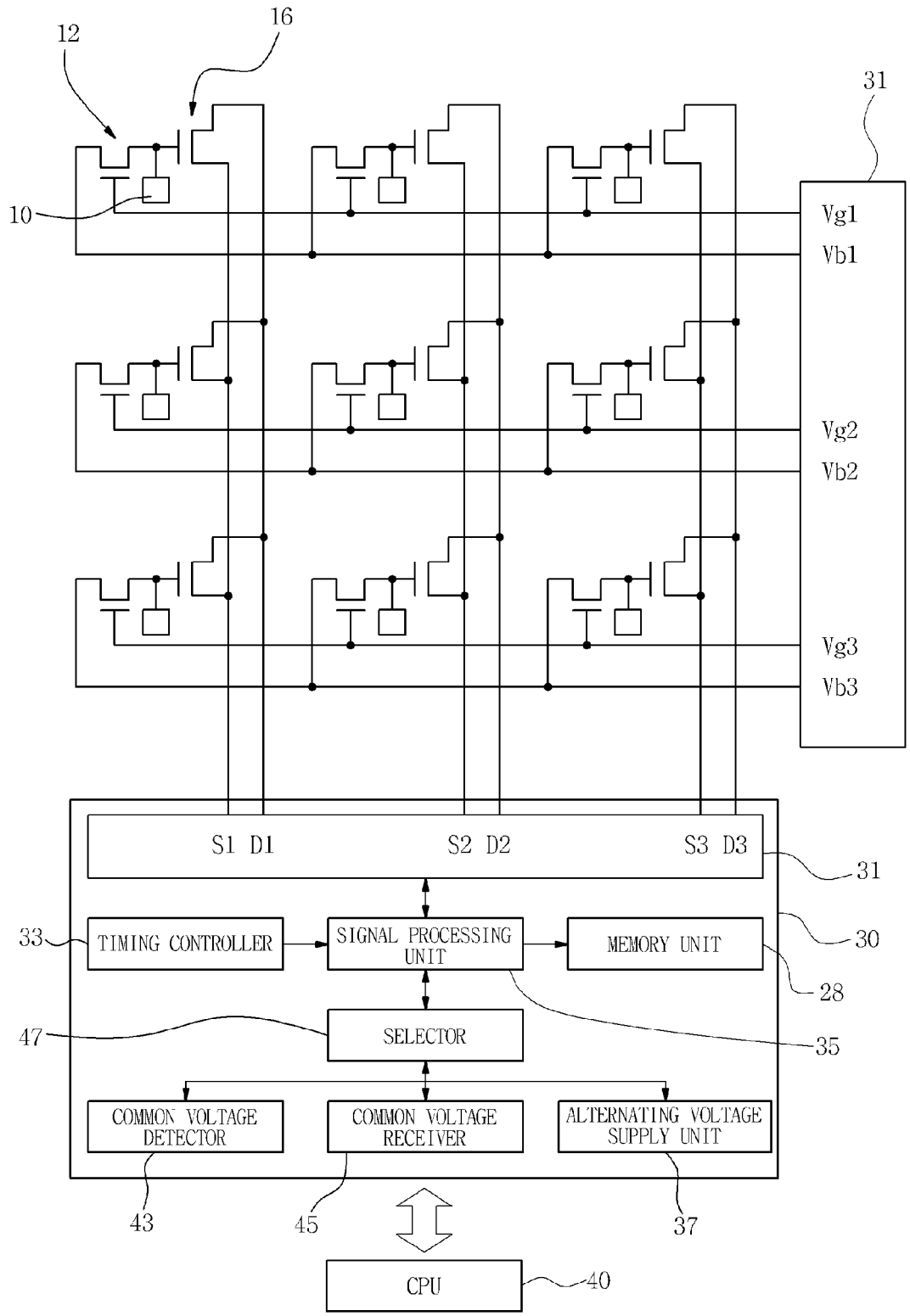
FIG. 14B is a schematic diagram showing a touch screen panel according to another embodiment of the present invention.

FIG. 14B shows a touch detecting device according to another embodiment of the present invention. In the embodiment illustrated in FIG. 14B, an operation of receiving or detecting a common voltage from a display device, and using the common voltage, and an operation of applying the common voltage to a common electrode 220 of the display device, may be performed.

In addition to the same components as those in the embodiment illustrated in FIG. 14B, the drive IC 30 may further include any one of a common voltage detecting unit 43, a common voltage receiver 45, and an alternating voltage supply unit 37. Otherwise, the drive IC 30 may be configured to include all of the common voltage detecting unit 43, the common voltage receiver 45, and the alternating voltage supply unit 37, as illustrated in FIG. 14B, and to further include a selector 47 in order to select any one of the common voltage detecting unit 43, the common voltage receiver 45, and the alternating voltage supply unit 37.

Figure 15A:
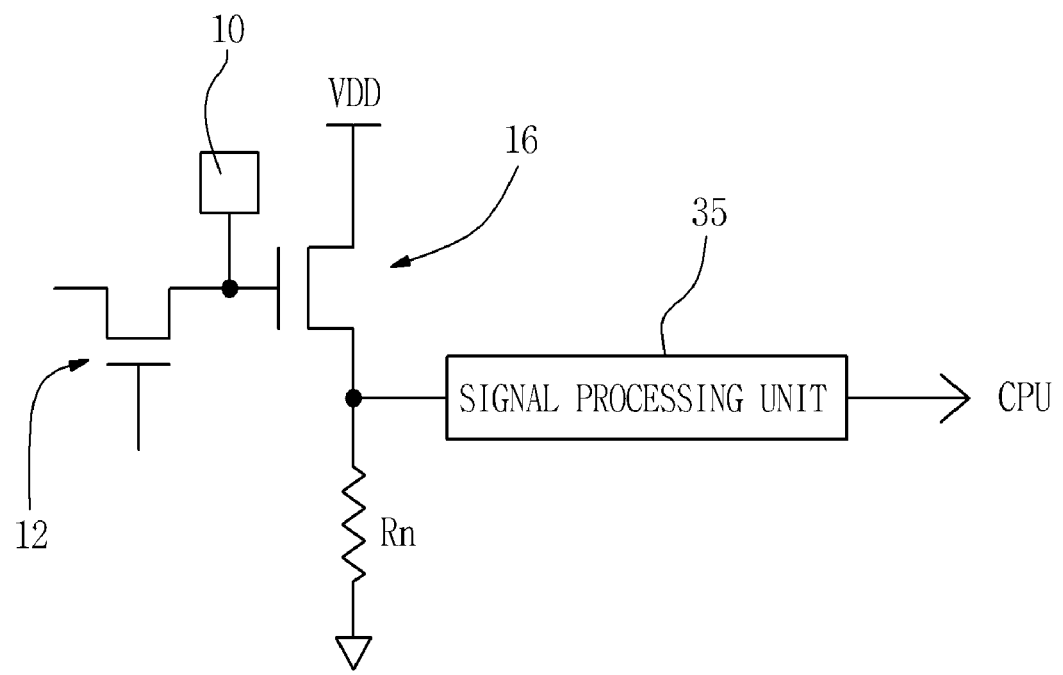
FIGS. 15A to 15D are circuit diagrams showing a signal processing unit according to respective embodiments of the present invention.

FIGS. 15A to 15D illustrate examples of acquiring a touch signal in a signal processing unit 35, respectively. These examples illustrate the cases where a signal detecting switching device 16 is applied as the level shift detector 14, respectively. Referring to FIG. 15A, a resistor Rn is connected to a source terminal that is the output end of the signal detecting switching device 16. In addition, the signal processing unit 35 reads a current flowing in the resistor Rn at the source terminal of the signal detecting switching device 16, or converts the resistor Rn and the current flowing in the resistor Rn into a voltage, to thereby acquire a touch signal. The acquired touch signal is delivered to the CPU 40.

Figure 15B:
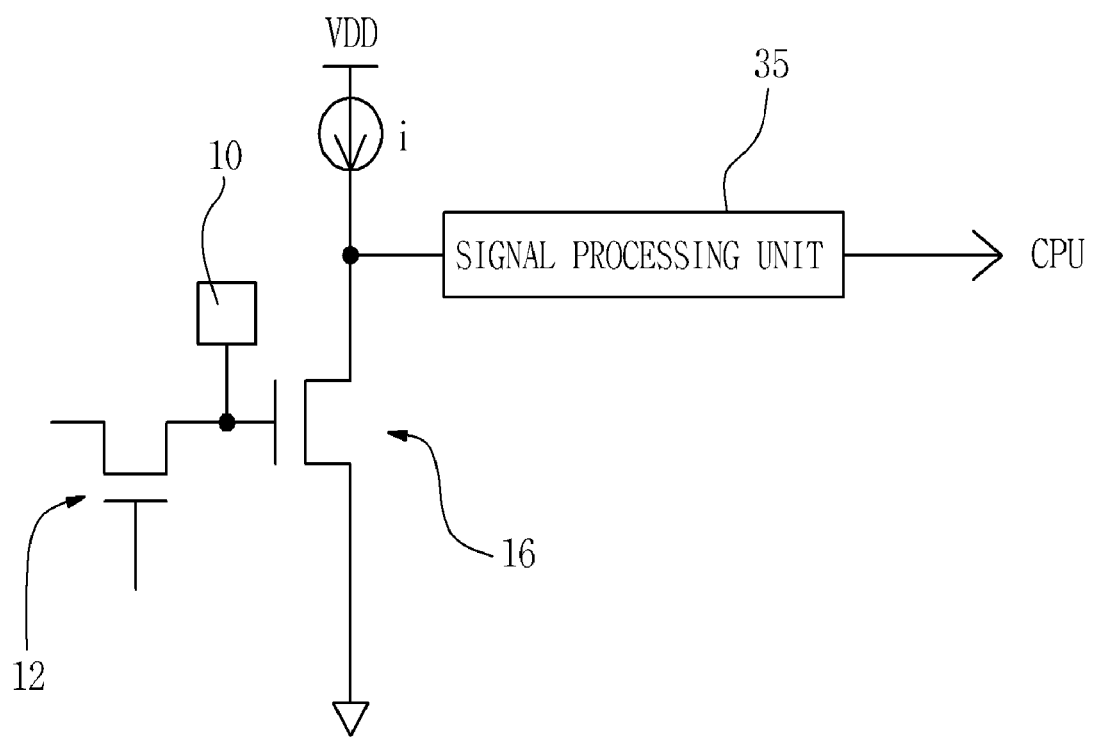

Referring to FIG. 15B, the signal processing unit 35 detects a voltage formed by Rds(on) that is a turn-on resistance of the signal detecting switching device 16 when a current flows in the drain terminal of the signal detecting switching device 16. In FIGS. 15A and 15B, the signal processing unit 35 includes a voltage detecting device such as an analog-to-digital converter (ADC) or a voltage-to-frequency converter (VFC), or a current detecting device such as a Hall sensor. In addition, although it is not shown in the drawing, the signal processing unit 35 may be constructed to detect a voltage or current at the source terminal or the drain terminal of the signal detecting switching device 16.

Meanwhile, in the embodiments of FIGS. 14A and 14B, since the signal detecting switching device 16 is provided in each unit cell, wires that are connected from the source terminal or the drain terminal of the signal detecting switching device 16 to the drive IC 30 are lengthened. In addition, such long-distance wires may increase a wiring resistance, and increase a coupling capacitance due to an overlap phenomenon between the wires at points where the wires cross each other. The resistance and coupling capacitance may reduce charging and discharging characteristics of signals and thus act as causes of delaying signals.

Figure 15C:
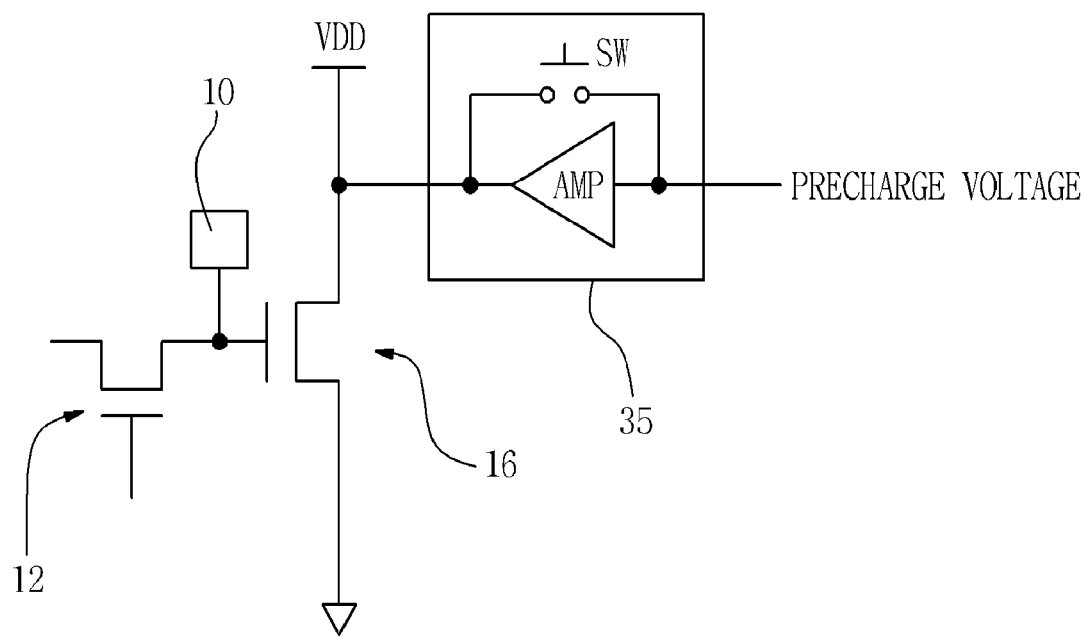
Figure 15D:
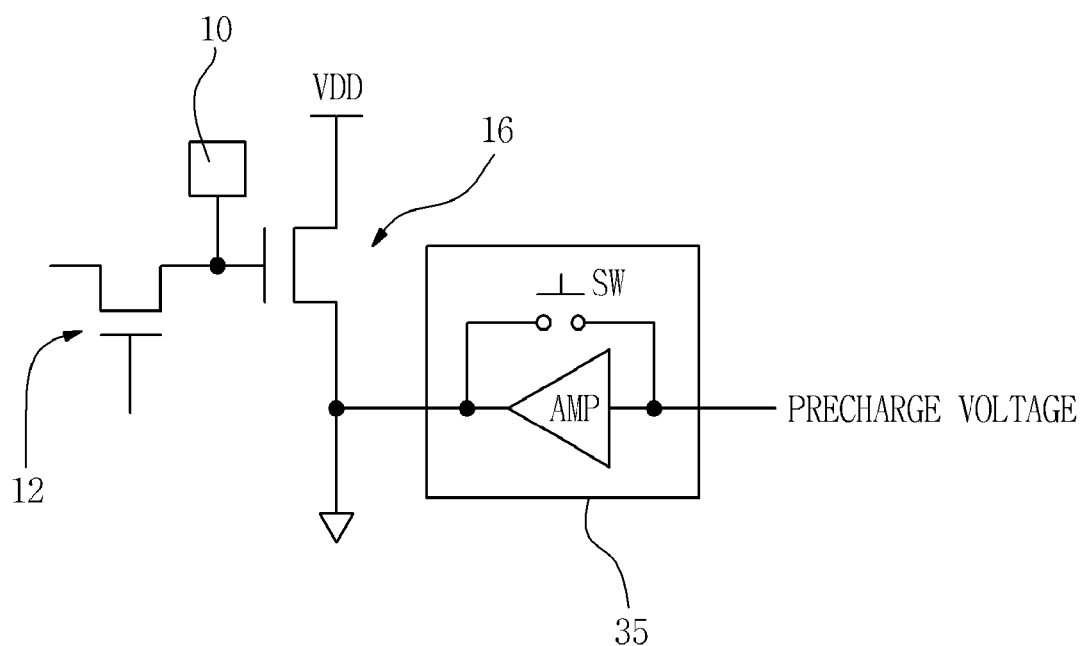

FIGS. 15C and 15D are signal processing units for solving the signal delay due to resistance and coupling capacitance, respectively, and show examples that the signal processing units 35 include pre-charge circuits, respectively. Referring to FIG. 15C, an amplifier (AMP) or a switch is connected to the wire connected to the drain terminal of the signal detecting switching device 16, and thus a pre-charge voltage is delivered toward the drain terminal of the signal detecting switching device 16 through the amplifier (AMP) or the switch. For example, if the central point of a touch voltage and a non-touch voltage detected at the drain terminal is 2V, the pre-charge voltage becomes 2V. In addition, since the drain terminal is pre-charged into 2V before detecting the touch signal, a high-speed operation may be performed without delaying signals. In FIG. 15C, the amplifier and the switch appear to be connected in parallel, but they are individually provided one by one. FIG. 15D illustrates an example that a pre-charge circuit is provided to the source terminal of the signal detecting switching device 16, and the signal processing unit of FIG. 15D operates in the same manner as that of FIG. 15C.

The signal processing unit 35 is required to synchronize all signals with changes of the common voltage of the common electrode 220 preferably, in order to observe the waveform of FIG. 9 or 12. Of course, even though all signals are not necessarily synchronized with changes of the common voltage, a touch signal may be obtained by relatively calculating the height of the detection signal with respect to the charging voltage, and reading the detection signal continuously several times. However, it is preferable that the signal processing unit 35 is made to synchronize all signals such as the charging signal and the detection signal with changes of the common voltage of the common electrode 220, to thus reliably perform a signal processing operation.

In the embodiment illustrated in FIG. 14B, the signal processing unit 35 may detect common voltage information of the common electrode 220 of the display device 200, receive common voltage information from the display device 200, or forcibly apply the alternating common voltage to the common electrode 220. In any case, the signal processing unit 35 may extract the starting point, the size, the rising time, and the falling time of the alternating common voltage from the common electrode 220, and process the signals corresponding thereto.

To do so, the drive IC 30 includes at least one of a common voltage detecting unit 43, a common voltage receiver 45, and an alternating voltage supply unit 37. Otherwise, the drive IC 30 includes three components as shown in FIG. 14B, and further includes a selector 47 to select and use one of three components.

The common voltage receiver 45 directly receives common voltage information of the common electrode 220 from the display device 200. In this case, the information about the starting point, the size, the rising time, and the falling time of the common voltage may be obtained very easily. It is very easy to get the signal processing unit 35 to process signals in linkage with the rising time and falling time of the common voltage. However, the display device 200 may have a burden of sending common voltage information.

Meanwhile, in the case that the common electrode 220 of the display device 200 has a certain DC level or is grounded with the ground signal, the alternating voltage supply unit 37 may force to apply an alternating voltage to the common electrode 220. The alternating voltage supply unit 37 applies a voltage level alternating at a predetermined frequency to the common electrode 220 according to the time divisional signal of the timing controller 33. The frequency of the alternating voltage applied to the common electrode 220 may be adjustable by adjusting a register, etc. Even in this case, the signal processing unit 35 may easily process signals in linkage with the rising time and falling time of the common voltage. However, a burden of sending an oscillating signal to the display device 200 may occur.

However, the common voltage detector 43 automatically detects common voltage information, and thus there is no need to send and receive information related to the common voltage to and from the display device. The common voltage detector 43 is configured in a manner of detecting whether the potential at the junction P1 is alternated according to alternation of the common voltage at a state where a supply of the charging signal has been cut off from the charging unit 12 and the sensor pattern 10 has been electrically isolated. The common voltage detector 43 may have a variety of circuit configurations. The detailed embodiments will be described later.

The embodiment of FIG. 14A or 14B illustrates an example that the charging unit 12 and the signal detecting switching device 16 are provided in a unit cell. However, when the charging unit 12 and the signal detecting switching device 16 are configured to include a TFT that mainly uses a metal layer, light may be reflected and visible. If a TFT is made of a transparent thin layer or there is no need to consider visibility like a touch pad of a laptop or notebook computer, there will be no problems. However, if a touch screen panel is provided on a display device, such a visibility problem may be issued.

Figure 16:
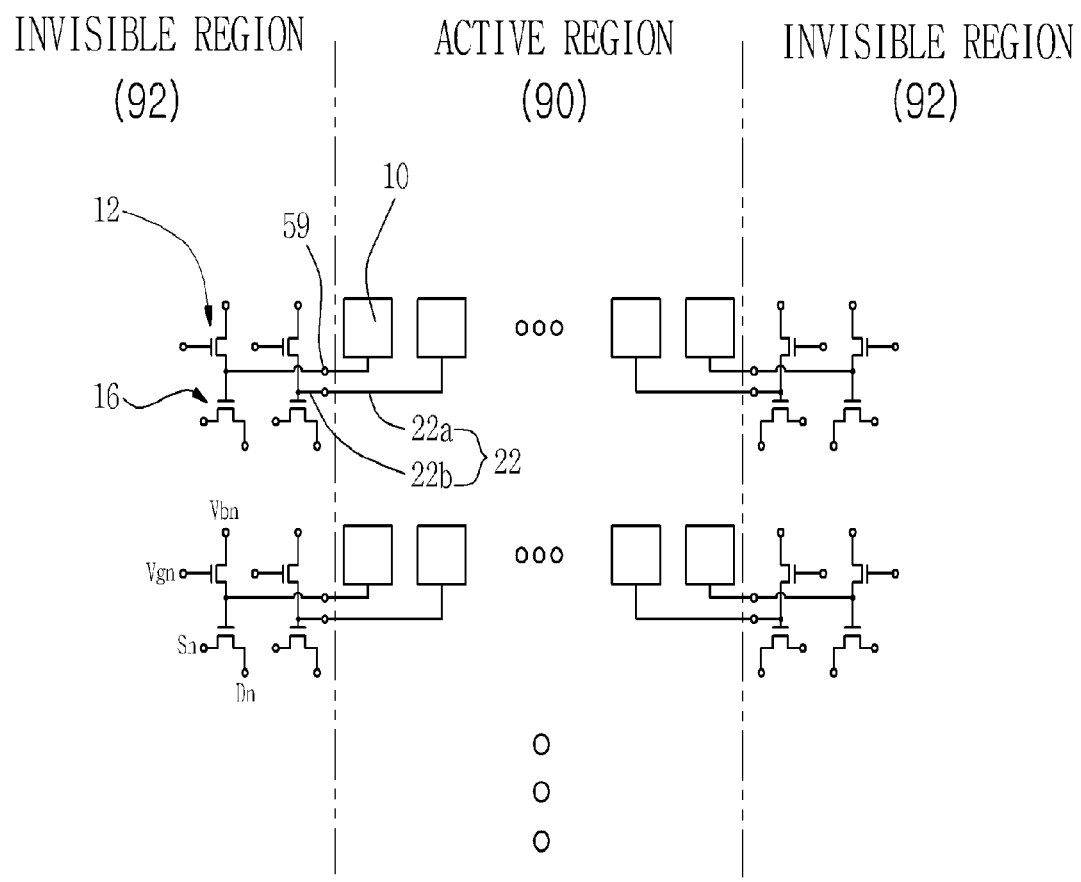
FIG. 16 is a schematic diagram showing a touch screen panel according to still another embodiment of the present invention.

FIG. 16 shows an example of getting rid of the visibility problem that may occur in the embodiment illustrated in FIGS. 14A and 14B. As shown in FIG. 16, only sensor patterns 10 are arranged in an active region 90 of the substrate 50 in the form of a dot-matrix pattern. In addition, signal wires 22 are withdrawn from the respective sensor patterns 10. The signal wires 22 are wired as transparent signal lines 22a in the active region 90 at least. The charging units 12 and the signal detecting switching devices 16 are integrated in an invisible region 92. Thus, the charging units 12 and the signal detecting switching devices 16 are hidden by a black ink, etc. In this embodiment, the charging units 12 and the signal detecting switching devices 16 are respectively provided at a distance from the sensor patterns 10, but the circuitry configurations are same as the embodiment of FIG. 14A or 14B.

Preferably, the charging units 12 and the signal detecting switching devices 16 are divided and formed at both sides of the substrate 50. Such a wiring structure shortens the length of the longest wire of the transparent signal wires 22a to thus reduce the wiring resistance at the transparent signal wires 22a, and reduce the number of the transparent signal wires 22a wired between the sensor patterns 10. Meanwhile, the transparent signal wires 22a may be wired in the longitudinal direction, and the charging units 12 and the signal detecting switching devices 16 may be dispersed at the upper and lower edge portions of the substrate 50, differently from the embodiment of FIG. 16.

In the embodiment of FIG. 16, the invisible region 92 is a region that is not visible, and thus the signal wires 22 are wired as metal signal wires 22b. Here, the transparent signal wires 22a and the metal signal wires 22b are formed in different layers, and thus are connected with one another through connectors 59 that are formed through a process such as contact holes.

The transparent signal wires 22a are formed of ITO, CNT (Carbon Nano Tube), ATO (Antimony Tin Oxide), IZO (Indium Zinc Oxide) or a transparent conductive material having characteristics similar to the ITO, CNT, ATO, and IZO. In order to reduce the wiring resistance of the transparent signal wires 22a, as much as possible, thickness and width of the transparent signal wires 22a may be appropriately selected. The transparent signal wires 22a, for example, have a thickness of about 50 Å to about 200 Å and is formed to have a width of about 10 μm to about 100 μm.

The metal signal wires 22b may be made of an aluminum group of metal such as aluminum and aluminum alloys, a silver group of metal such as silver and silver alloys, a copper group of metal such as copper and copper alloys, a molybdenum group of metal such as molybdenum and molybdenum alloys, chrome, titanium, and tantalum. In addition, the metal signal wires 22b may include two films whose physical properties differ, that is, a lower film (not shown) and an upper film (not shown) disposed on the lower film. The upper film is made of a low specific resistivity metal, for example, an aluminum group of metal such as aluminum and aluminum alloys, so as to reduce a signal delay or a voltage drop. In contrast, the lower film is made of a material having an excellent characteristic contacting ITO and IZO, for example, such as molybdenum (Mo), molybdenum alloys, and chromium (Cr).

In the embodiment of FIG. 16, even in the case that TFTs are used as the charging units 12 and the signal detecting switching devices 16, there is no need to form light shield layers on the upper surfaces of the TFTs as they are provided in a black ink region, and a circuit pattern in the inside of the active region is simplified, to thus reduce the number of sheets of photo masks and to thereby simplify a manufacturing process. However, the number of the transparent signal wires 22a wired between the sensor patterns 10 is increased, to thus make it difficult to maintain intervals between the transparent signal wires 22a and to thereby cause limitations on physical touch resolutions. The following embodiments are provided to solve such constraints.

Figure 17:
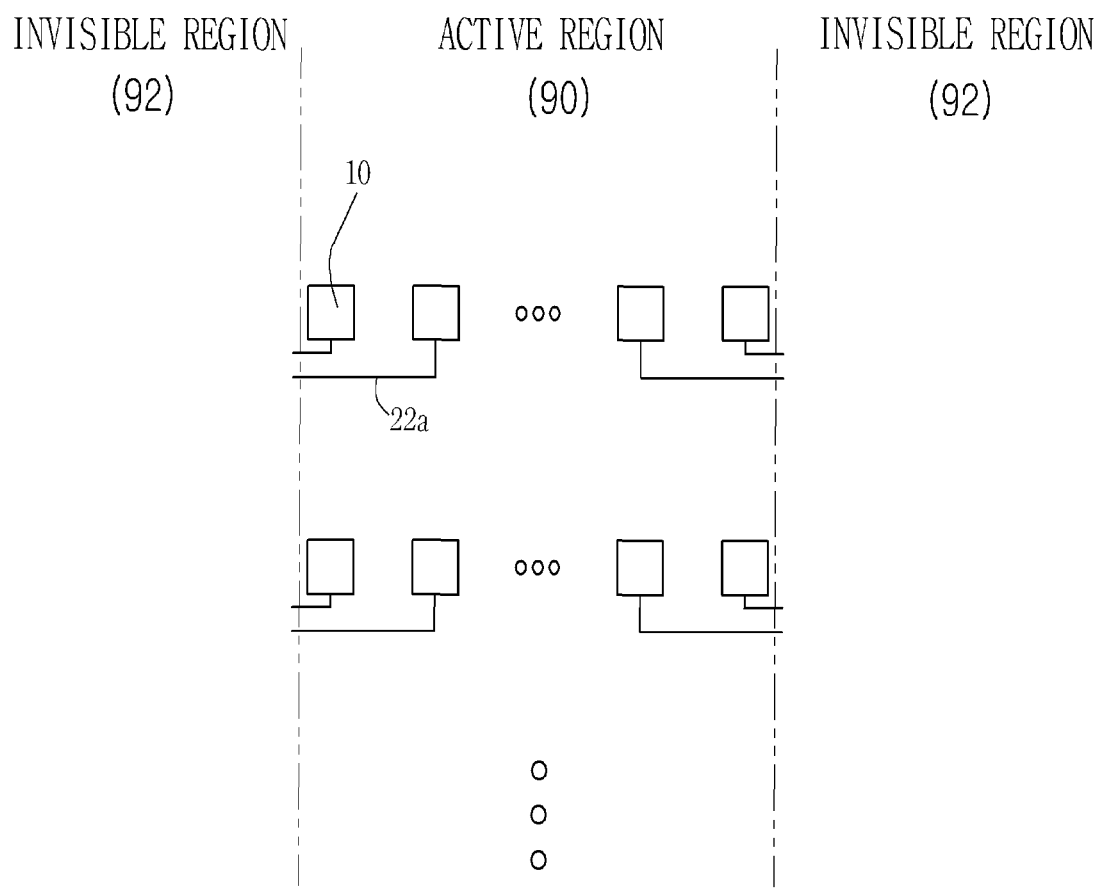
FIGS. 17 to 19 are schematic diagrams sequentially showing an example of configuring a sensor pattern into multiple layers.
Figure 18:
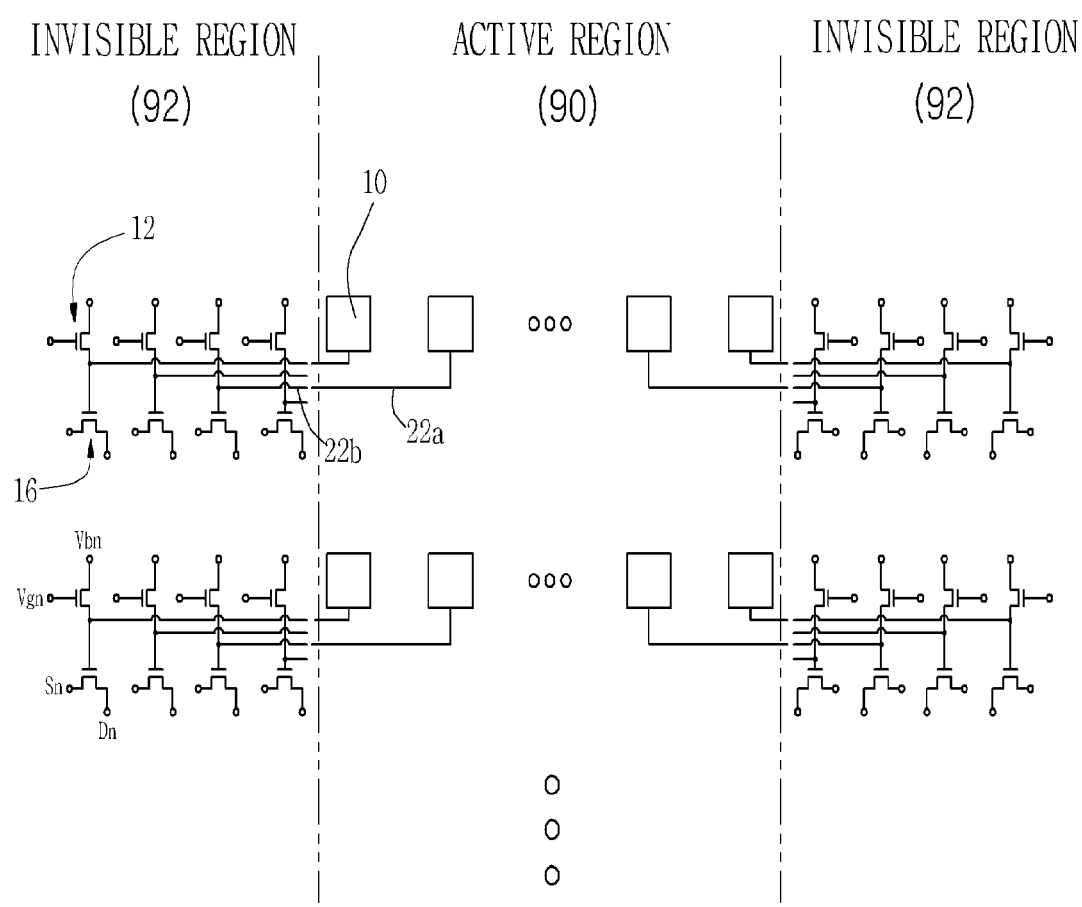
Figure 19:
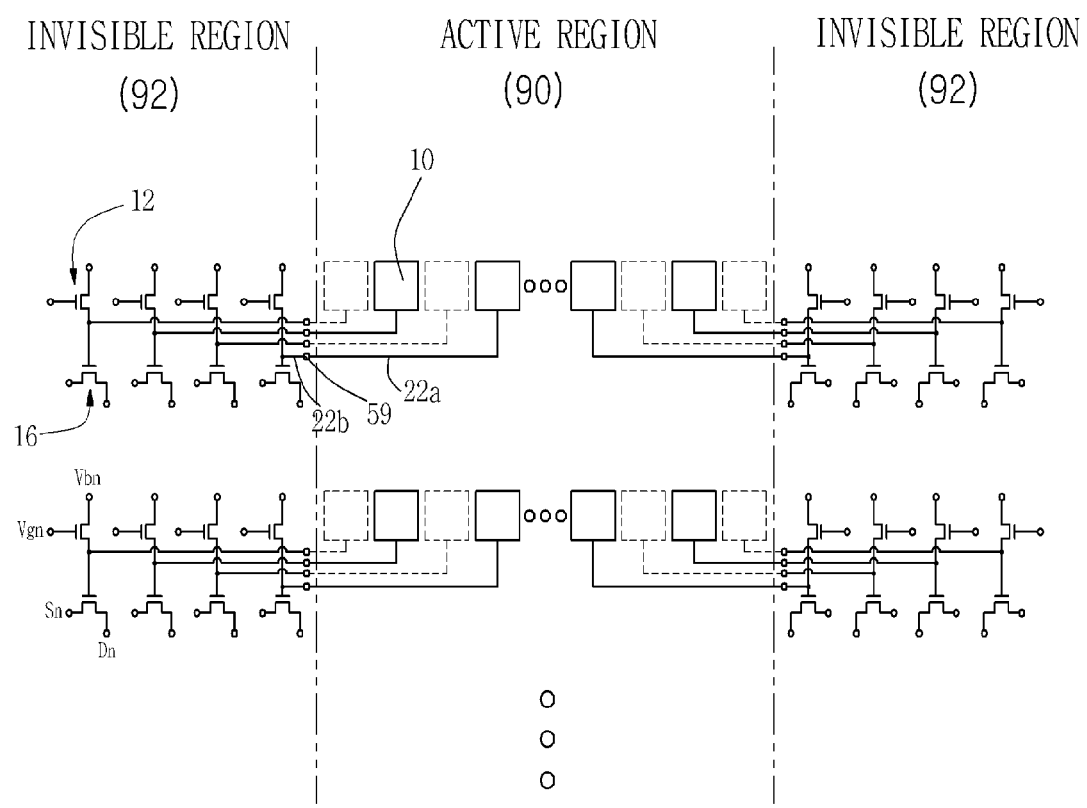

FIGS. 17 to 19 show examples that sensor patterns 10 and transparent signal wires 22a are formed in a plurality of layers in an active region 90. If the sensor patterns 10 are formed in a plurality of layers as described above, the physical touch resolutions may be increased, and wiring rules of the transparent signal wires 22a passing between the sensor patterns 10 may increase the degree of freedom. Meanwhile, although the sensor patterns 10 are formed in a plurality of layers in the embodiments of FIGS. 17 to 19, intersection points where the transparent signal wires 22a cross in the active region 90 do not occur. Thus, the coupling capacitance due to the intersection of the transparent signal wires 22a does not occur, and processing issues for insulating the intersection of the transparent signal wires 22a do not occur.

Referring to FIGS. 17 to 19, a process of forming the sensor patterns 10 by using a plurality of layers will follow.

As shown in FIG. 17, the sensor patterns 10 and the transparent signal wires 22a are formed in the active region 90. A transparent conductive material such as ITO is coated on the substrate 50 by using a sputtering or coating process, to thus form a conductive layer. The conductive layer is exposed or etched by using a photomask process, to thus form a pattern shown in FIG. 17.

Then, as shown in FIG. 18, the charging units 12 and the signal detecting switching devices 16 are integrated in the invisible region 92. In this case, if TFTs are used as switching devices, wires in the invisible region 92 are formed as metal signal wires 22b in the process of forming gate metal or source metal.

Then, after having formed a protective layer to cover the active region 90, the sensor patterns 10 and the transparent signal wires 22a that are shown in dotted lines in FIG. 19 are formed on the protective layer. In addition, the transparent signal wires 22a and the metal signal wires 221 are connected through a process of contact holes in the invisible region 92. Finally, an additional protective layer may be further formed in order to protect the sensor pattern 10 of the uppermost layer during processing or carrying.

As described above, if the sensor patterns 10 and the transparent signal wires 22a are formed of multiple layers, the sensor patterns 10 may be disposed at dense intervals, and the upstairs transparent signal wires 22a may be disposed in between the downstairs transparent signal wires 22a. Therefore, the number of the signal wires wired between the sensor patterns 10 may be increased, and wiring rules of the transparent signal wires 22a in an identical layer may be adopted more freely. Ultimately, the physical touch resolution may be increased even when the embodiment of FIG. 16 (or an embodiment of FIG. 20 which will be described later) is implemented.

Figure 20:
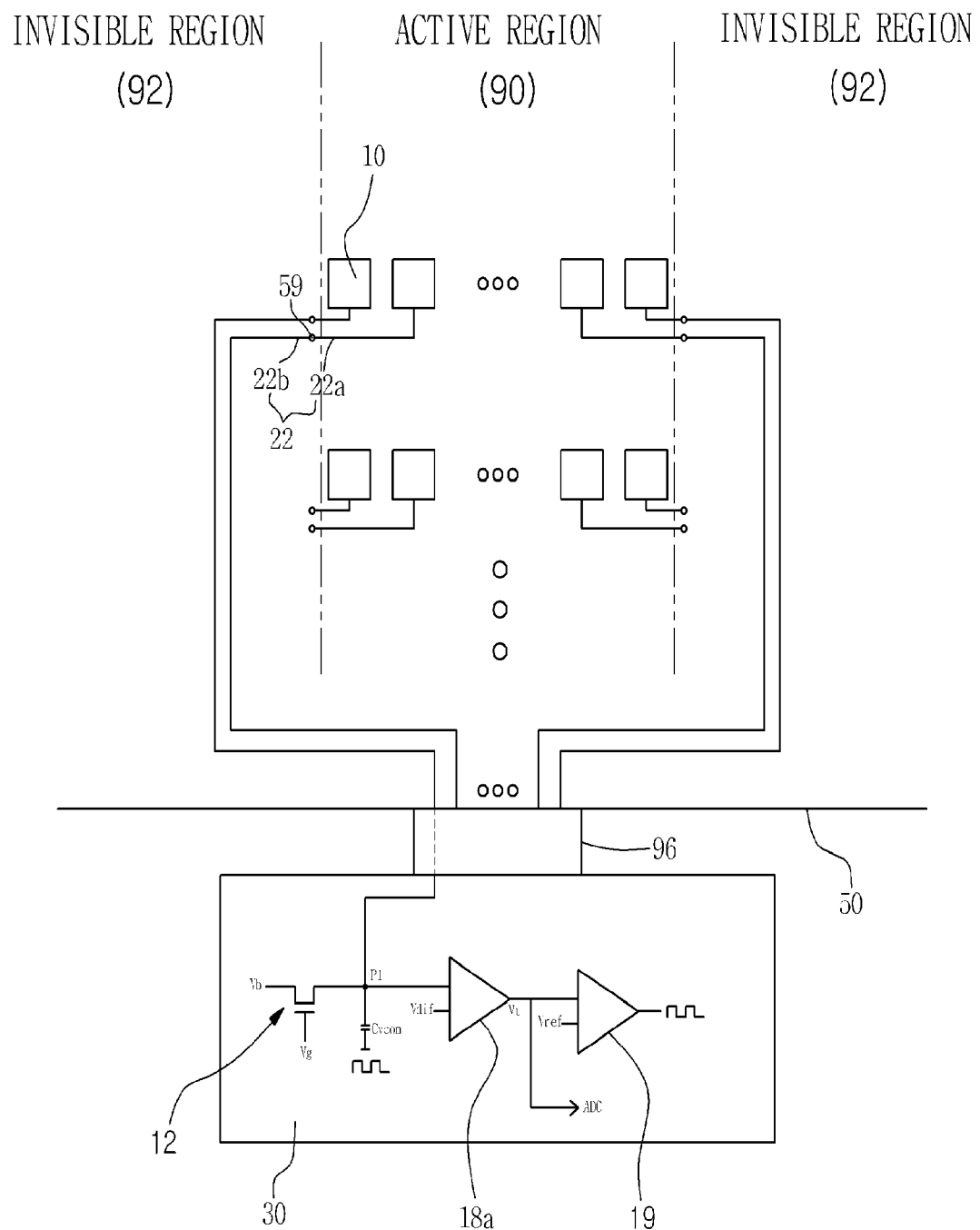
FIG. 20 is a schematic diagram showing a touch screen panel according to yet another embodiment of the present invention.

FIG. 20 shows another embodiment of the touch screen panel. In the embodiment of FIG. 20, the touch detecting device of FIG. 11B is applied in which the sensor patterns 10 are arranged in the form of a dot-matrix pattern.

Referring to FIG. 20, the sensor patterns 10 and the signal wires 22 are formed in the active region 90 of the substrate 50. The signal wires 22 may be wired as the metal signal wires 22b in the active region 90, but preferably may be wired as the transparent signal wires 22a in the active region 90. In the same manner as in the embodiment of FIG. 16, the signal wires 22 may be wired as the transparent signal wires 22a in the active region 90, and may be wired as the metal signal wires 22b that are connected with the transparent signal wires 22a through connectors 59 in the invisible region 92. However, the charging unit 12 and the level shift detector 14 are provided in the drive IC 30 in FIG. 20.

The level shift detector 14 may be a switching device that is mounted in the drive IC 30. However, as shown, if the differential amplifier 8a is used as the level shift detector 14, the touch signal is amplified and processed, it is easy to capture the touch signal. Since the touch detecting device using the differential amplifier 18a has been described with reference to FIG. 11B, a detailed description thereof will be omitted.

In the embodiment of FIG. 20, the sensor patterns 10 are withdrawn as the separate signal wires 22, respectively. Therefore, the drive IC 30 does not need to scan the sensor patterns 10 by rows or columns. The drive IC 30 may scan and supply a charging signal for each unit cell. In addition, alternatively, the drive IC 30 may scan and supply a charging signal for a few unit cell clusters. In addition, the drive IC 30 may scan and supply a charging signal for a group of unit cells away from each other. These scanning techniques enable multi-touch without limits on the number of recognizable touch points.

However, in the embodiment of FIG. 20, it can be seen that a distance from the sensor pattern 10 to the level shift detector 14 is significant. In this case, Cp in Equations 1 and 2 acts larger than the previous embodiment. Cp includes capacitances acting between the signal wires 22 and the electrodes of the display device, capacitances acting mutually between the signal wires 22, capacitances acting at bonding locations of FPC (Flexible Printed Circuit) 96 and the drive IC 30, and other parasitic capacitances. As noted earlier, the larger Cp, the smaller the size of the level shift at the time of occurrence of a touch input in contrast to at the time of non-occurrence of a touch input. Therefore, there is a need to design Cp to be small.

Meanwhile, in both the embodiments of FIGS. 16 and 20, the charging unit 12 and the level shift detector 14 are separately provided for each unit cell of the sensor patterns 10, but are only the exemplary embodiments. For example, a plurality of sensor patterns 10 may be grouped and connected with the charging unit 12 and the level shift detector 14, through a multiplexer (MUX). In addition, signals from the sensor patterns 10 within the group are multiplexed and thus the signal from each sensor pattern 10 may be individually processed.

Figure 21:
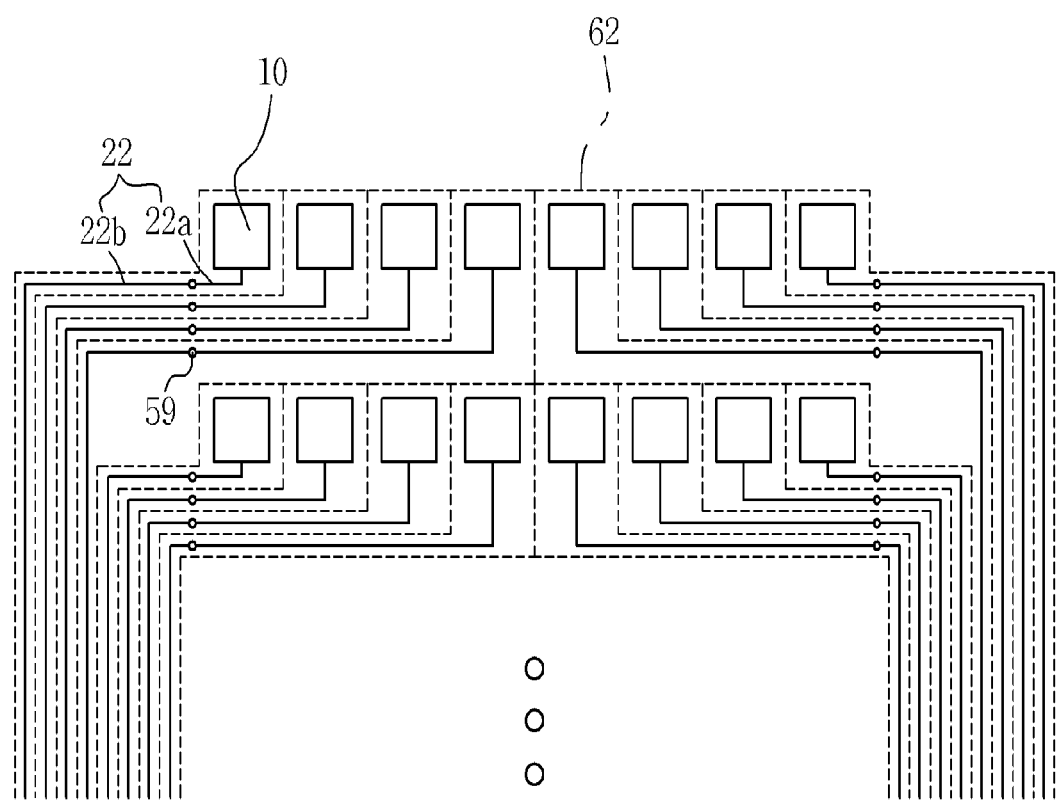
FIG. 21 is a schematic diagram showing an example of minimizing a coupling in the embodiment of FIG. 20.

FIG. 21 shows an example of reducing Cp by minimizing a coupling in the embodiment of FIG. 20. Referring to FIG. 21, shield lines 62 are formed between the sensor patterns 10 and the signal wires 22, as illustrated by dotted lines. All the shield lines 62 are connected in common to the ground terminal. These shield lines 62 reduce parasitic capacitances such as coupling capacitances. In addition, the shield lines 62 may solve problems of disconnecting the signal wires 22 or influencing on the display device due to ESD (Electrostatic Discharge).

Figure 22:
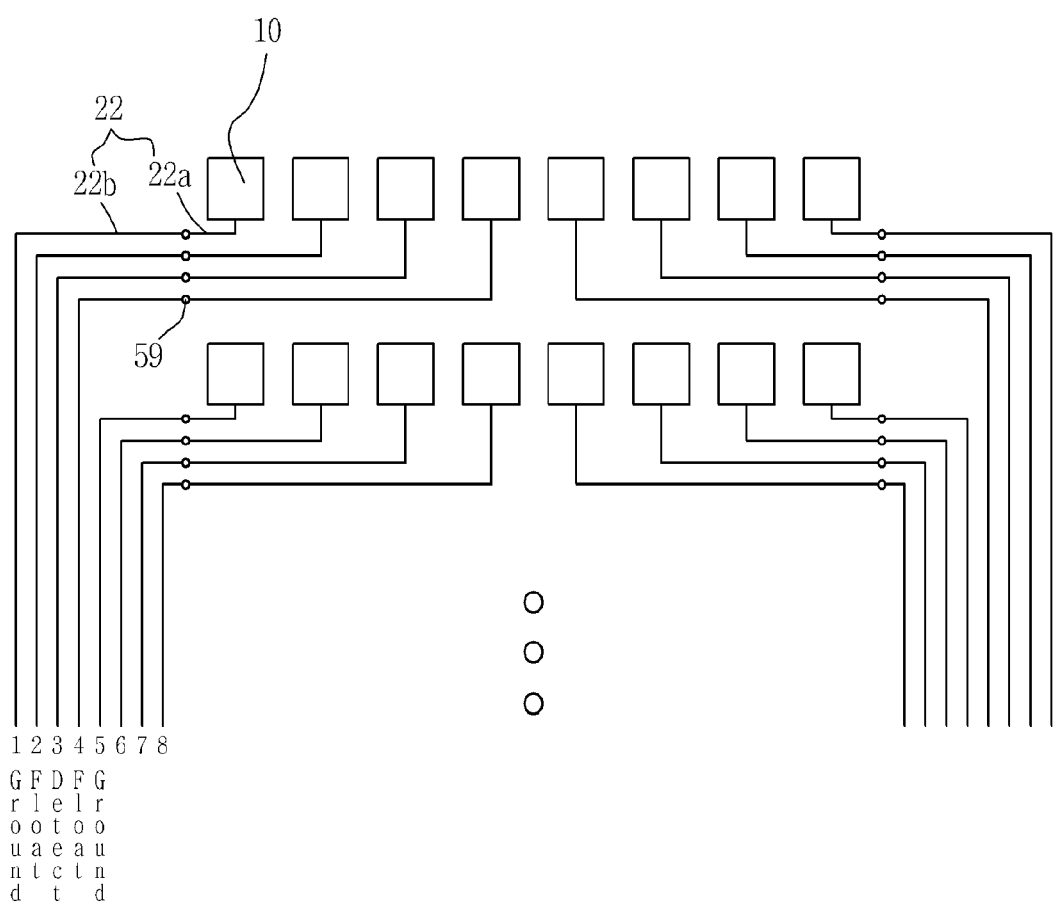
FIG. 22 is a schematic diagram showing another example of minimizing a coupling in the embodiment of FIG. 20.

FIG. 22 shows another example of minimizing a coupling in the embodiment of FIG. 20. Referring to FIG. 22, eight signal wires 22 that are withdrawn to the left are shown. The respective signal wires 22 are numbered from one to eight from left.

A charging signal is applied through a number one signal wire, and a number two signal wire is floated and a number three signal wire is grounded, in an interval of detecting a level shift. Next, the number one and three signal wires are floated and a number four signal wire is grounded, in an interval of detecting a level shift through the number two signal wire. Next, as shown in FIG. 22, the number two and four signal wires are floated and number one and five signal wires are grounded, in an interval of detecting a level shift through the number three signal wire. The respective lines may be scanned as described above, or five signal wires are grouped and simultaneously scanned as described above while shifting. If the signal wires in both sides of the signal wires in the detecting interval are floated and the signal wires in the lateral sides of the floated signal wires are grounded, that is, a dynamic shield is achieved as described above, a coupling phenomenon between the signal wires may be blocked more perfectly.

Even in the embodiment of FIG. 20, like the embodiment of FIG. 16, the physical touch resolution may be limited due to the wiring of the transparent signal wires 22a. In the embodiment of FIG. 20, constraints on the physical touch resolution may be solved to a degree in the same manner as those of the embodiments of FIGS. 17 to 20. In addition, the touch resolution may be enhanced in other ways.

Figure 23:
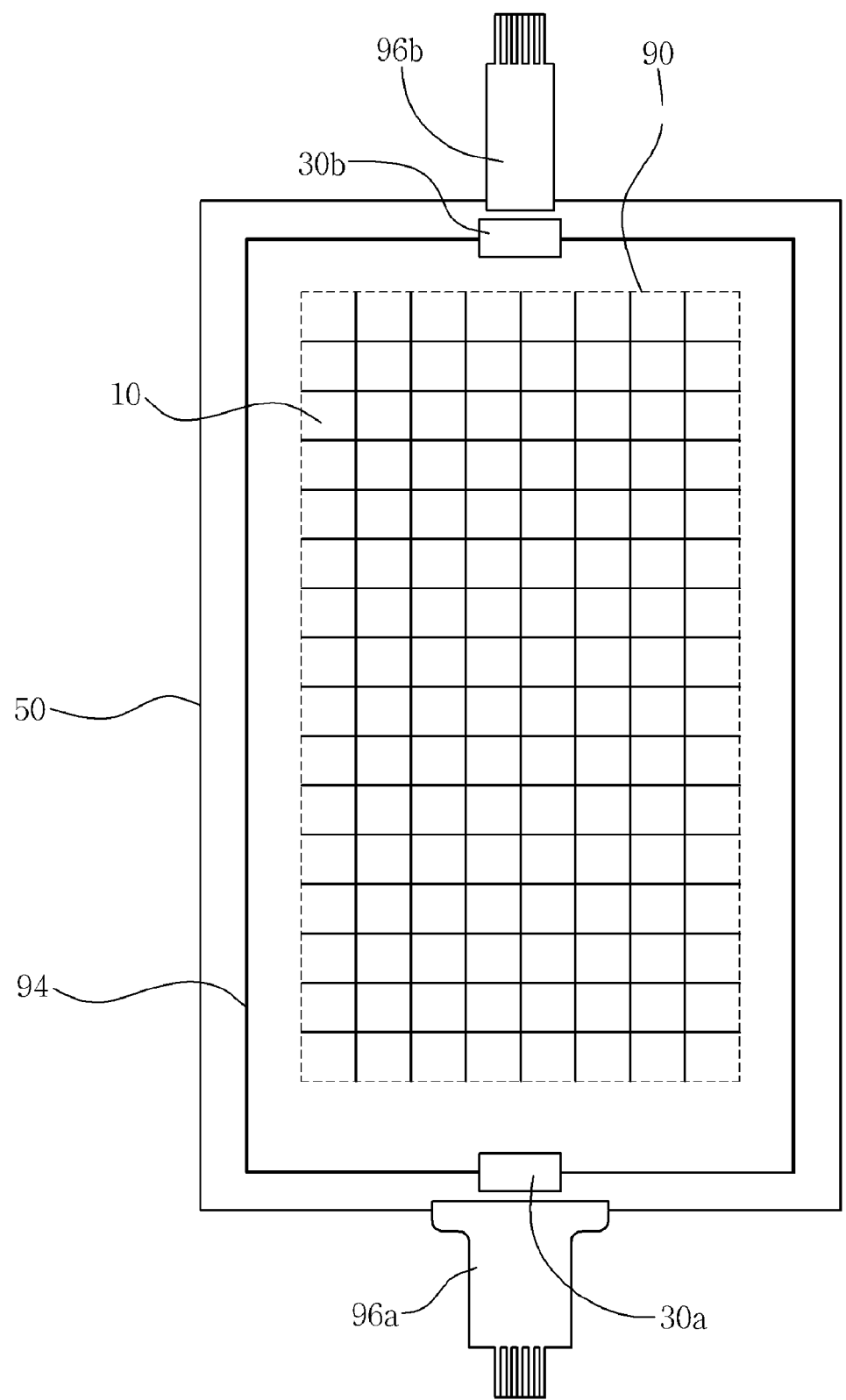
FIG. 23 is a plan view showing an example in which a plurality of drive integrated circuits (ICs) are provided.

FIG. 23 shows another way to increase a touch resolution in the embodiment of FIG. 16 or 20. Referring to FIG. 23 a plurality of drive ICs may be mounted on a substrate 50. Preferably, when a plurality of drive ICs 30 are mounted, the drive ICs 30 are mounted on a glass substrate 50 in the form of a chip on glass (COG), as shown. The drive IC 30 includes a master driver IC 30a that delivers touch signals externally, and a slave drive IC 30b that is connected to the master drive IC 30a via a communication channel 94 on the substrate 50.

The FPC 96a for sending and receiving signals externally is connected to the master drive IC 30a. Since the slave drive IC 30b communicates with the master drive IC 30a through the communication channel 94, a separate FPC does not need to be connected to the slave drive IC 30b. However, in order to be distinguished from power lines, a FPC 96b for power delivery may be connected to the slave drive IC 30b as shown.

In order to prevent conflicts between signals detected by the master drive IC 30a and signals detected by the slave drive IC 30b, the master drive IC 30a gives priority to both the signals detected by the master drive IC 30a and the slave drive IC 30b, or gives a scanning order, or uses a separate memory space, to thereby process touch signals.

Figure 24:
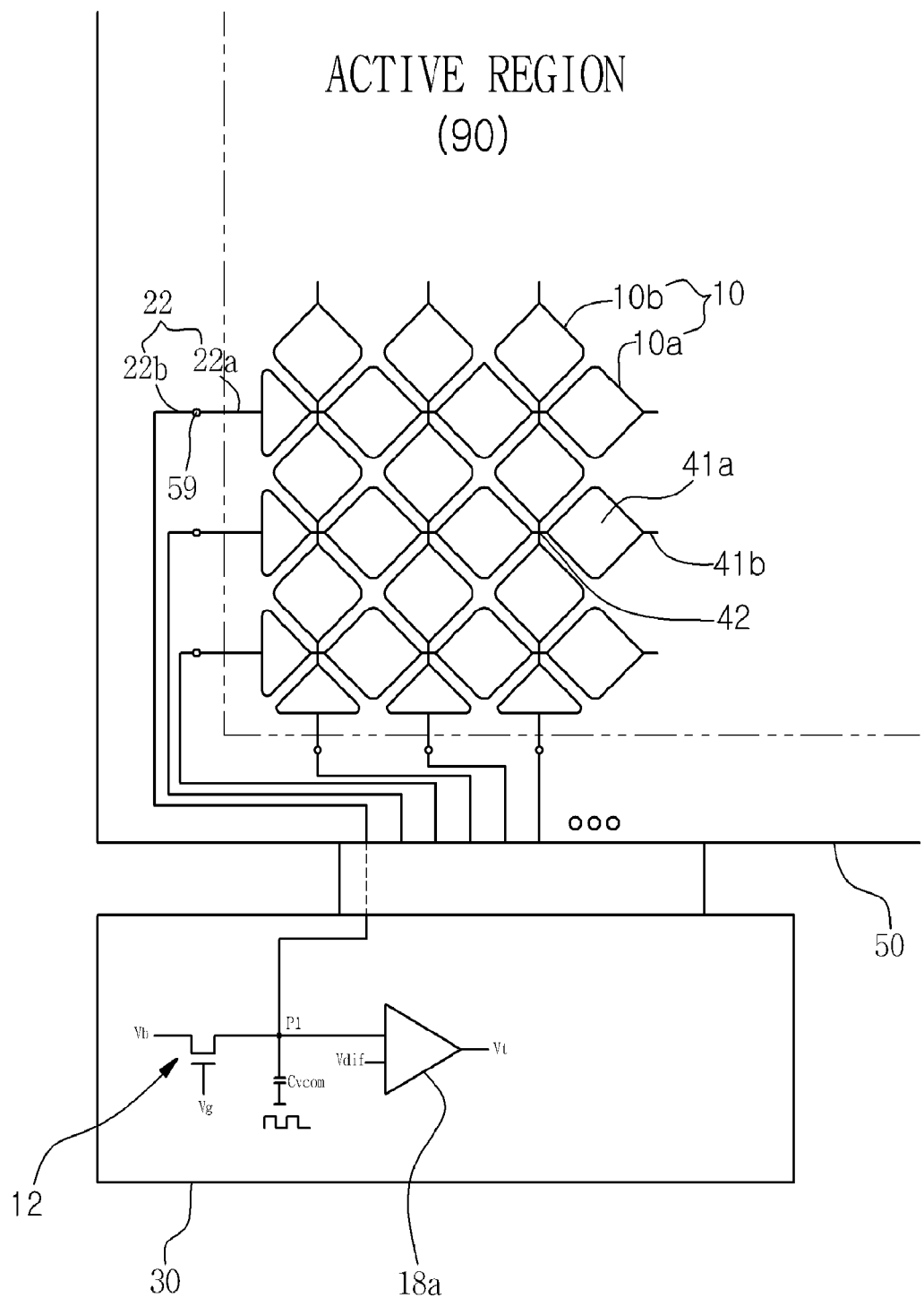
FIG. 24 is a schematic diagram showing a touch screen panel according to still yet another embodiment of the present invention.

FIG. 24 shows another embodiment of a touch screen panel. In the previous embodiments of the touch screen panel, the sensor patterns 10 are arranged in the form of a dot-matrix pattern, but in the embodiment of FIG. 24, the sensor patterns 10 are arranged in the form of a linear pattern. Referring to FIG. 24, x-axis linear sensor patterns 10a and y-axis linear sensor patterns 10b are crosswise arranged in the active region 90 of the substrate 50. Each of the linear sensor patterns 10a and 10b includes an opposite area portion 41a for forming a touch capacitance Ct with respect to a touch input instrument, and a connection portion 41b for connecting the opposite area portion 41a with another opposite area portion 41a. In addition, the x-axis linear sensor patterns 10a and y-axis linear sensor patterns 10b cross each other at the connection portions 41b, to thus form crossing portions 42.

The crossing portions 42 are intended to mutually isolate the different axis linear sensor patterns 10a and 10b. For example, the connection portions 41b of the x-axis linear sensor patterns 10a are first formed, and then an insulating layer is formed on top of the connection portions 41b of the x-axis linear sensor patterns 10a, and then the connection portions 41b of the y-axis of the linear sensor patterns 10b are formed in the form of a bridge so as to pass over the insulating layer.

As described above, if the sensor patterns are arranged in a linear pattern, Cvcom becomes large, and Ct becomes relatively small. But, as shown in FIG. 24, if the level shift is detected by using the differential amplifier 18a, the level shift due to Ct may be easily captured.

The big advantage of the embodiment of FIG. 24 is that the number of the signal wires 22 wired in the invisible region 92 of the substrate 50 is greatly reduced. If the sizes of the sensor patterns 10 are designed to be small, the physical touch resolution may be increased compared to the preceding embodiments even though the number of the signal wires 22 that are wired at the edge portions of the substrate 50 is not designed to become large.

Figure 25:
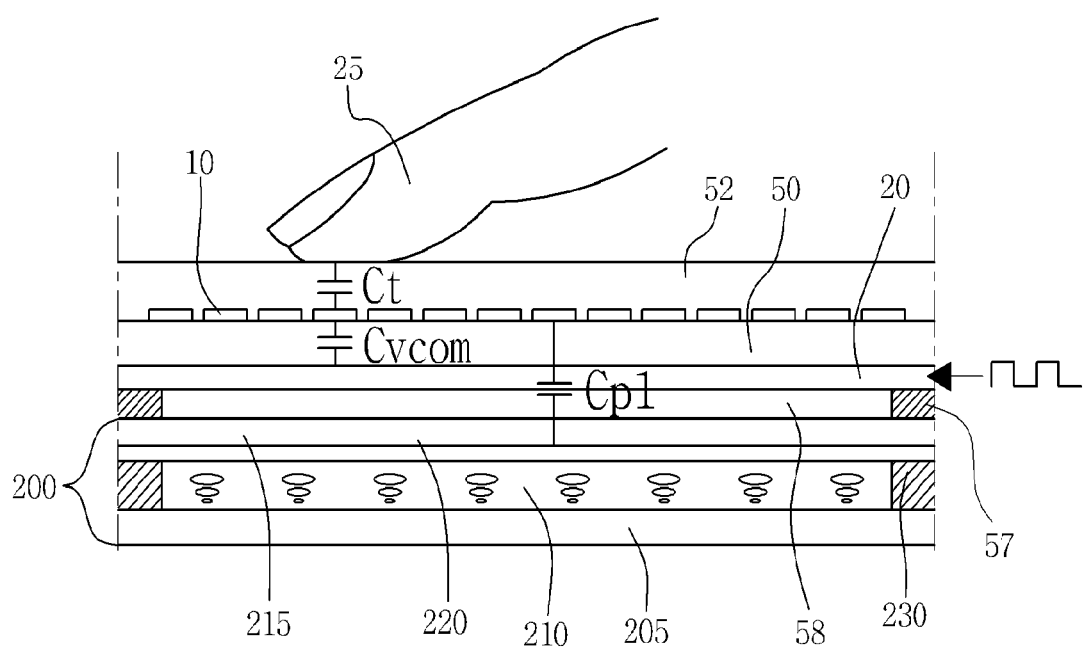
FIG. 25 is a cross-sectional view showing an example in which a touch screen panel is mounted.
Figure 26:
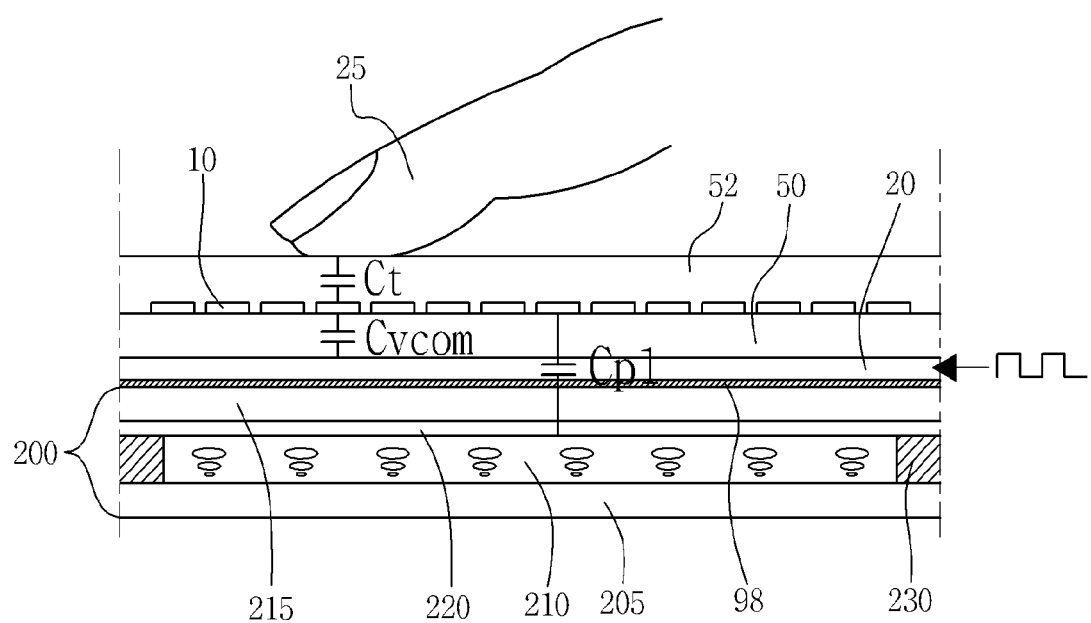
FIG. 26 is a cross-sectional view showing another example in which a touch screen panel is mounted.
Figure 27:
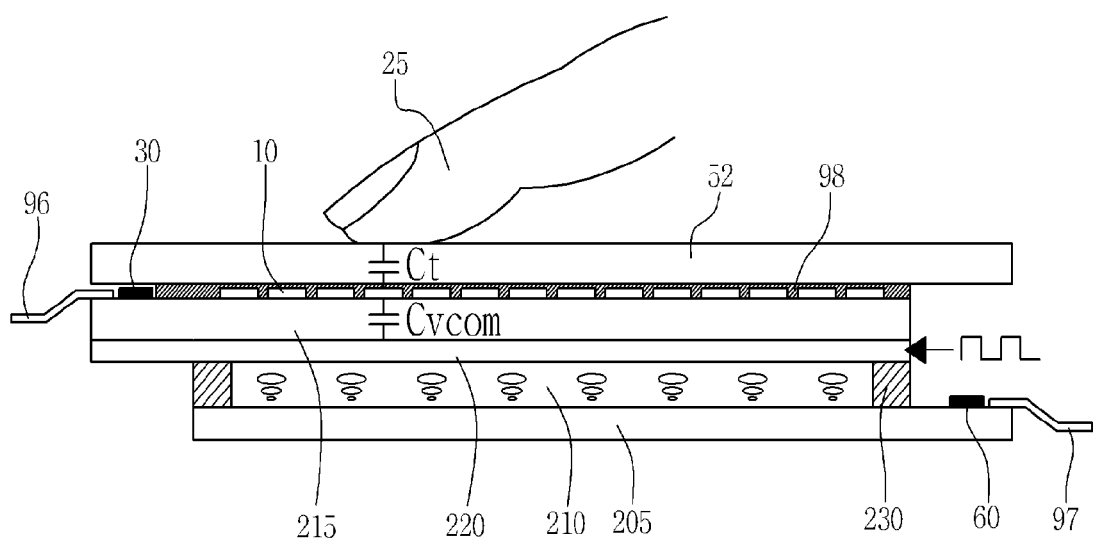
FIG. 27 is a cross-sectional view showing a display device having a built-in touch screen panel according to the present invention.
Figure 28:
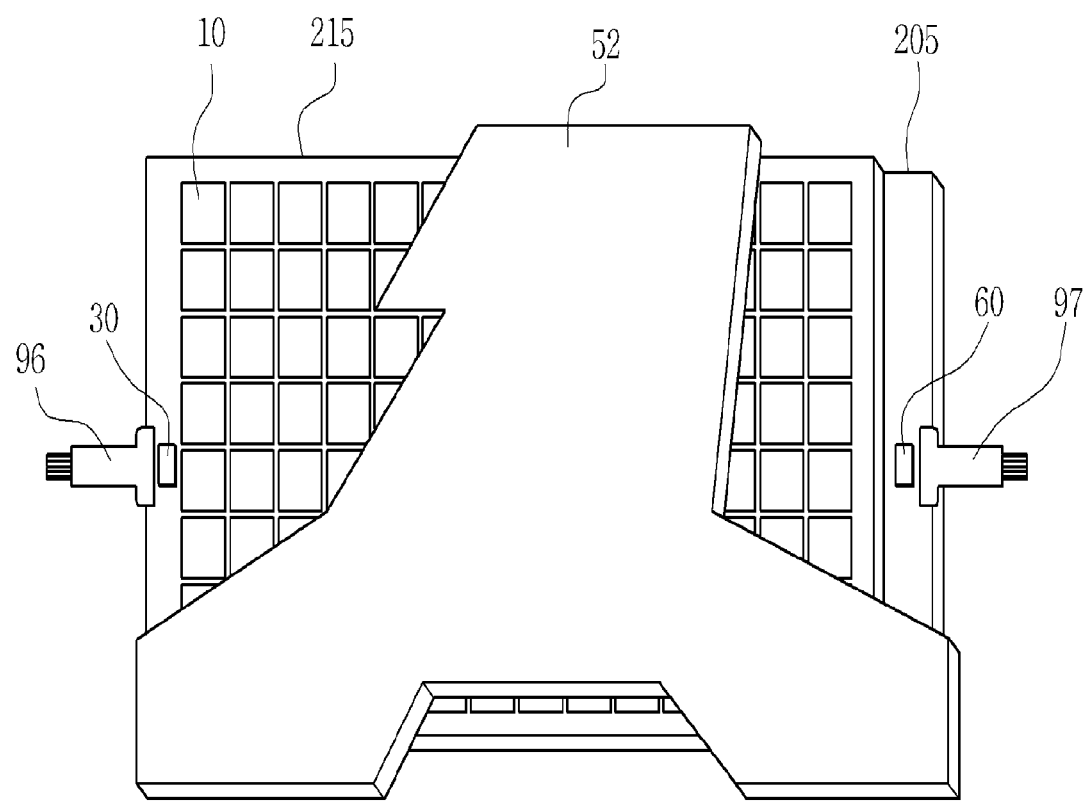
FIG. 28 is a disassembled perspective view illustrating the embodiment of FIG. 26.

FIGS. 25 and 26 are schematic diagrams cross-sectionally showing examples of mounting a touch screen panel, respectively. FIGS. 27 and 28 are a cross-sectional view and an exploded perspective view showing a display device having a touch screen panel, respectively. Referring to FIGS. 25 to 28, a touch screen panel and a display device with a built-in touch screen panel according to the present invention will be described as follows.

FIG. 25 shows an example of mounting a touch screen panel on a display device. The display device 200 has a structure in which liquid crystal is sealed and filled between a lower TFT substrate 205 and an upper color filter 215, to thus form a liquid crystal layer 210. To seal the liquid crystal, the TFT substrate 205 and the color filter 215 are joined by sealants 230 at their outer portions. Although they are not shown, polarizing plates are attached on the top and bottom of the LCD panel, and besides optical sheets such as a back light unit (BLU) and a brightness enhancement film (BEF) are provided.

As shown, a touch screen panel is provided on top of the display device 200. The touch screen panel has a structure that the linear sensor patterns 10 and the common electrode 20 are put on the upper and lower surfaces of the substrate 1, as shown in the embodiment of FIG. 7. A protection panel 52 for protecting the touch screen panel is attached on the uppermost surface of the device. As in the embodiment of FIG. 25, in order to minimize noise from the display device, the touch screen panel is bonded to the upper portion of the display device 200 through the medium of an adhesive member 57 such as a double adhesive tape (DAT), at its outer portions, and an air gap 58 is formed between the touch screen panel and the display device 200. In such a structure, since Cp becomes very small, a more stable touch signal may be obtained.

However, as described in the previous embodiments, according to the present invention, the common electrode 20 that is the closest to the sensor pattern 10 alternates and the common electrode 20 is a factor that has the biggest impact on the voltage variation at the junction P1. Therefore, noise may be easily removed without forming the air gap 58 as described above. The embodiment of FIG. 26 shows another example of mounting a touch screen panel. As shown in FIG. 26, a touch screen panel may be directly attached on the upper surface of the display device 200. For example, a touch screen panel may be attached on the display device 200 with an ultraviolet curable resin 98, OCA (Optically Clear Adhesive), a silicon tape, etc.

In the embodiments of FIGS. 25 and 26, a touch screen panel may be attached on top of various types of display devices, respectively. For example, as shown, in the case of a touch screen panel is additionally mounted on a LCD, the LCD has its own Vcom. Here, if the Vcom electrode of the LCD is in a transverse electric field mode that is formed on the TFT substrate 205, noise clue to the Vcom of the LCD is relatively small. In contrast, as shown in FIGS. 25 and 26, if the Vcom electrode 220 of the LCD is formed on the lower surface of the color filter 215, and the Vcom electrode 220 undergoes line inversion, noise due to this may occur relatively largely.

However, as shown, if a parasitic capacitance due to the Vcom electrode 220 of the LCD is Cp1, the Cp1 is significantly distant from the sensor pattern 10 compared to the common electrode 20 that is placed on the lower surface of the substrate 50. In addition, only the substrate 50 acts as a medium between the sensor pattern 10 and the common electrode 20, but the substrate 50, the air gap 58, or media such as the ultraviolet curable resin 98, the polarization plate, BEF, and the color filter 215 are put between the sensor pattern 10 and the Vcom electrode 220 of the display device. Therefore, an influence of the Vcom electrode 220 of the LCD is negligible. In addition, Cp due to the negligible impact may be sufficiently filtered in the level shift detector 14.

FIGS. 27 and 28 show a display device with a built-in touch screen panel according to the present invention, which illustrate a LCD, respectively. Referring to FIGS. 27 and 28, the color filter 215 of the display device 200 may be replaced with a touch-screen panel according to the present invention. As shown, the sensor patterns 10 are formed on the upper surface of the color filter 215, and the common electrode 20 is formed on the lower surface of the color filter 215. A protection panel 52 may be mounted on the upper surface of the display device 200. The protection panel 52 prevents the display device 200 from being damaged by touch inputs. In addition, the protection panel 52 may also play a role of a window on which company's logos or icons are printed.

In the illustrated example, a drive IC 60 for a LCD display is mounted in the form of a COG pattern on the TFT substrate 205. A drive IC 30 for controlling a touch signal is mounted in the form of a COG pattern on the color filter 215. FPCs 96 and 97 are withdrawn from the drive ICs 30 and 60, respectively.

If the LCD of FIGS. 27 and 28 undergoes line inversion, the common electrode 20 may be used as the common electrode of the display device. In addition, the alternating common voltage applied to the common electrode 20 is applied from the alternating voltage supply unit 37 of the touch drive IC 30 or applied from the drive IC 60 of the LCD. Further, the touch drive IC 30 and the LCD drive IC 60 may be integrated into a single IC. In addition, the TFT substrate 205 and the color filter 215 are connected to the FPCs so as to transmit and receive signals externally.

Meanwhile, although it is not shown in the drawings, the touch screen panel may be built-in between the color filter 215 and the polarization plate (not shown). As described above, the invention has been described with respect to the preferred embodiments. However, the invention is not limited to the above embodiments, and it is possible for one who has an ordinary skill in the art to make various substitutions, modifications and variations without departing off the spirit of the invention defined by the claims.

INDUSTRIAL APPLICABILITY

In the capacitive touch detecting device using a level shift, the touch detecting method, and the display device having the capacitive touch detecting device according to the present invention, a surface-type common electrode is formed at a distance spaced away from sensor patterns, a common voltage level alternating at a predetermined frequency is applied to the common electrode, and it is detected whether or not a level shift occurs in a voltage variation of the sensor patterns, depending on whether or not a touch input occurs, to thereby acquire a touch signal. Influences due to a parasitic capacitance generated by vertical noise, a coupling phenomenon, or other factors from the display device are minimized, and erroneous recognition of signals does not occur. A touch input is detected at a relatively high voltage level, to thus easily capture a signal even with a small cross-sectional area of a touch input instrument, and to thereby make it possible to perform a stylus pen input. A touch share of a touch input instrument is obtained depending on size of a shift level, to thus increase resolution and enable fine handwriting and drawing. An active region of a touch panel may be configured into a single-layer, to thus simplify a manufacturing process and provide an effect of obtaining an excellent yield.

The invention claimed is:

1. A capacitive touch detecting device for detecting occurrence of a touch capacitance (Ct) by an approach of a bodily finger or a touch input instrument such as a conductor similar to the bodily finger, the capacitive touch detecting device comprising:
   a plurality of sensor patterns, each of the sensor patterns forming the touch capacitance (Ct) between the touch input instrument and the sensor pattern when a touch input occurs, wherein the sensor patterns are formed on the substrate and are formed of a transparent conductor;
   a common electrode that forms a common electrode capacitance (Cvcom) between each of the sensor patterns and the common electrode;
   a charging unit that supplies a charge signal to each of the sensor patterns to thus accumulate charges in the common electrode capacitance (Cvcom); and
   a level shift detecting unit that detects a level shift that occurs in a voltage variation in the sensor pattern at the time of occurrence of the touch input, with respect to another voltage variation in the sensor pattern at the time of non-occurrence of the touch input, to thereby acquire a touch signal, wherein the common electrode has a common voltage (Vcom) level that alternates at a predetermined frequency, wherein the level shift detecting unit detects a level shift between the voltage variations arising from the sensor pattern by the common voltage (Vcom) before and after the occurrence of the touch input, and wherein the sensor patterns are grouped and connected with the charging unit and the level shift detecting unit through a multiplexer, and signals from the sensor patterns within the group are multiplexed by the multiplexer and thus the signal from each of the sensor patterns is individually processed.

2. The capacitive touch detecting device according to claim 1, wherein the voltage variation at the time of non-occurrence of the touch input is determined by following Equation 1, wherein the voltage variation at the time of addition of the touch capacitance (Ct) is determined by following Equation 2, and wherein the level shift uses a difference between the voltage variations of the following Equations 1 and 2, $$\Delta Vsensor = \pm(VcomH - VcomL)\frac{Cvcom}{Cvcom + Cp} \quad 1$$

$$\Delta Vsensor = \pm(VcomH - VcomL)\frac{Cvcom}{Cvcom + Cp + Ct}, \quad 2$$

in which ΔVsensor is a voltage variation in the sensor pattern, VcomH is a high level voltage of the common electrode, VcomL is a low level voltage of the common electrode, Cvcom is a common electrode capacitance, Cp is a parasitic capacitance, and Ct is a touch capacitance.

3. The capacitive touch detecting device according to claim 1, wherein the level shift detecting unit detects the level shift in the sensor pattern at the rising time and/or falling time of the common voltage level.

4. The capacitive touch detecting device according to claim 1, wherein the level shift detecting unit detects a touch share of the touch input instrument with respect to the sensor pattern on the basis of size of the level shift.

5. The capacitive touch detecting device according to claim 1, wherein the level shift detecting unit comprises an amplifier to amplify the signal from the sensor pattern.

6. The capacitive touch detecting device according to claim 5, wherein the amplifier is a differential amplifier to differentially amplify the signal from the sensor pattern.

7. The capacitive touch detecting device according to claim 5, wherein the amplifier has a high-impedance state input thereby isolating the charges charged in the common electrode capacitance (Cvcom) when the charging unit is turned off.

8. The capacitive touch detecting device according to claim 1, wherein the common electrode is a common electrode of a display device on which the touch detecting device has been mounted, and wherein the capacitive touch detecting device further comprises a common voltage receiving unit that receives common voltage information of the common electrode from the display device.

9. The capacitive touch detecting device according to claim 1, further comprising a common voltage supply unit that applies the common voltage to the common electrode.

10. A capacitive touch detecting method for detecting occurrence of a touch capacitance (Ct) by an approach of a touch input instrument to a sensor pattern of a plurality of sensor patterns, wherein the sensor patterns are formed of a transparent conductor, the capacitive touch detecting method comprising the steps of:

supplying, by a charging unit, a charging signal to each of the sensor patterns and a common electrode capacitance (Cvcom) formed between each of the sensor patterns and a common electrode, a common voltage (Vcom) being applied to the common electrode;

interrupting, by the charging unit, the supply of the charging signal to thereby isolate the charges of the charging signal;

detecting, by a level shift detecting unit, a voltage variation in the sensor pattern at the time of occurrence of a touch input; and detecting, by the level shift detecting unit, a level shift between the voltage variations before and after the occurrence of the touch input, wherein the charging unit supplies the charge signal to each of the sensor patterns to thus accumulate charges in the common electrode capacitance (Cvcom), and wherein the sensor patterns are grouped and connected with the charging unit and the level shift detecting unit through a multiplexer, and signals from the sensor patterns within the group are multiplexed by the multiplexer and thus the signal from each of the sensor patterns is individually processed.

11. The capacitive touch detecting method of claim 10, wherein the voltage variation at the time of non-occurrence of the touch input is determined by following Equation 1, wherein the voltage variation at the time of addition of the touch capacitance (Ct) is determined by following Equation 2, and wherein the level shift uses a difference between the voltage variations of the following Equations 1 and 2, $$\Delta Vsensor = \pm(VcomH - VcomL)\frac{Cvcom}{Cvcom + Cp} \quad 1$$

$$\Delta Vsensor = \pm(VcomH - VcomL)\frac{Cvcom}{Cvcom + Cp + Ct}, \quad 2$$

in which ΔVsensor is a voltage variation in the sensor pattern, VcomH is a high level voltage of the common electrode, VcomL is a low level voltage of the common electrode, Cvcom is a common electrode capacitance, Cp is a parasitic capacitance, and Ct is a touch capacitance.

12. The capacitive touch detecting method of claim 10, wherein the common voltage (Vcom) has a level that alternates at a predetermined frequency, and wherein the level shift is detected at the rising time and/or falling time of the common voltage level.

13. The capacitive touch detecting method of claim 10, further comprising a step of detecting a touch share of the touch input instrument with respect to the sensor pattern on the basis of size of the level shift.

14. The capacitive touch detecting method of claim 10, further comprising a step of differentially amplifying the signal from the sensor pattern.

15. The capacitive touch detecting method of claim 14, wherein a differential input signal is the voltage variation at the time of the non-occurrence of the touch input, at the differential amplifying step.

16. The capacitive touch detecting method of claim 15, further comprising a step of storing the voltage variation at the time of the non-occurrence of the touch input in a memory with respect to the sensor pattern.

17. A display device having a built-in capacitive touch detecting device for detecting occurrence of a touch capacitance (Ct) by an approach of a bodily finger or a touch input instrument such as a conductor similar to the bodily finger, wherein the capacitive touch detecting device comprises:

a plurality of sensor patterns, each of the sensor patterns forming the touch capacitance (Ct) between the touch input instrument and the sensor pattern when a touch input occurs, each of the sensor patterns being disposed at a distance spaced from a common electrode to thus form a common electrode capacitance (Cvcom), wherein the sensor patterns are formed of a transparent conductor;

a charging unit that supplies a charge signal to each of the sensor patterns to thus accumulate charges in the common electrode capacitance (Cvcom);

a level shift detecting unit that detects a level shift that occurs in a voltage variation in the sensor pattern at the time of occurrence of the touch input, with respect to another voltage variation in the sensor pattern at the time of non-occurrence of the touch input, to thereby acquire a touch signal, wherein the common electrode has a common voltage (Vcom) level that alternates at a predetermined frequency, wherein the level shift detecting unit detects a level shift between the voltage variations arising from the sensor pattern by the common voltage (Vcom) before and after the occurrence of the touch input, wherein the level shift detecting unit detects the level shift in the sensor pattern at a rising time and a falling time of the common voltage level, and wherein the sensor patterns are grouped and connected with the charging unit and the level shift detecting unit through a multiplexer, and signals from the sensor patterns within the group are multiplexed by the multiplexer and thus the signal from each of the sensor patterns is individually processed.

18. The display device according to claim 17, further comprising a common voltage receiving unit that receives common voltage information of the common electrode.

19. The display device according to claim 17, further comprising a common voltage detecting unit that detects a common voltage level of the common electrode.

20. The display device according to claim 17, wherein the charging unit and the level shift detecting unit are provided in an invisible region.

21. The capacitive touch detecting device according to claim 1, further comprising an air gap between the capacitive touch detecting device and a display device.

22. The capacitive touch detecting method of claim 10, further comprising a step of forming an air gap between the capacitive touch detecting device and a display device.

* * * * *